US011636092B2

(12) United States Patent
Buerk et al.

(10) Patent No.: US 11,636,092 B2
(45) Date of Patent: Apr. 25, 2023

(54) GENERAL, FLEXIBLE, RESILENT TICKETING INTERFACE BETWEEN A DEVICE MANAGEMENT SYSTEM AND TICKETING SYSTEMS

(71) Applicant: ConnectWise, Inc., Tampa, FL (US)

(72) Inventors: Gregory Francis Buerk, Whitehouse, OH (US); Scott Logan, Arlington, MA (US)

(73) Assignee: ConnectWise, LLC, Tampa, FL (US)

( * ) Notice: Subject to any disclaimer, the term of this patent is extended or adjusted under 35 U.S.C. 154(b) by 38 days.

(21) Appl. No.: 17/239,886

(22) Filed: Apr. 26, 2021

(65) Prior Publication Data

US 2021/0240696 A1    Aug. 5, 2021

Related U.S. Application Data

(60) Continuation of application No. 15/948,184, filed on Apr. 9, 2018, now Pat. No. 10,990,582, which is a
(Continued)

(51) Int. Cl.
*G06F 7/02* (2006.01)
*G06F 16/00* (2019.01)
(Continued)

(52) U.S. Cl.
CPC ........ *G06F 16/2365* (2019.01); *G06F 16/178* (2019.01); *G06F 16/25* (2019.01);
(Continued)

(58) Field of Classification Search
CPC .... G06F 16/2365; G06F 16/25; G06F 16/275; G06F 16/178; G06Q 10/06316; G06Q 30/016
See application file for complete search history.

(56) References Cited

U.S. PATENT DOCUMENTS 6,026,500 A    2/2000  Topff et al.
6,742,141 B1   5/2004  Miller
(Continued)

OTHER PUBLICATIONS

Non-Final Office Action on U.S. Appl. No. 15/948,184 dated Jul. 7, 2020.
(Continued)

*Primary Examiner* — Bruce M Moser
(74) *Attorney, Agent, or Firm* — Foley & Lardner LLP

(57) ABSTRACT

Systems and methods of the present disclosure facilitate synchronizing data between a device management system and ticketing systems. In some embodiments, the system includes an update module, a mapping module, and a service board selection module. The update module may be configured to update ticketing information about a ticketing ticket on the ticketing system to match device management information about a device management ticket on the device management system. The mapping module may be configured to select a ticket category for a device management ticket on the device management system responsive to the device management information about the device management ticket. The service board selection module may be configured to select a service board for a ticketing ticket on the ticketing system.

16 Claims, 27 Drawing Sheets

Related U.S. Application Data continuation of application No. 14/972,842, filed on Dec. 17, 2015, now Pat. No. 9,940,349, which is a division of application No. 13/796,116, filed on Mar. 12, 2013, now Pat. No. 9,245,249.

(51) Int. Cl.
　　*G06F 16/23*　　　(2019.01)
　　*G06F 16/25*　　　(2019.01)
　　*G06F 16/178*　　(2019.01)
　　*G06F 16/27*　　　(2019.01)
　　*G06Q 30/016*　　(2023.01)
　　*G06Q 10/0631*　　(2023.01)

(52) U.S. Cl.
　　CPC ..... *G06F 16/275* (2019.01); *G06Q 10/06316* (2013.01); *G06Q 30/016* (2013.01)

(56) References Cited

U.S. PATENT DOCUMENTS

| | | | |
|---|---|---|---|
| 6,751,729 | B1 | 6/2004 | Giniger et al. |
| 6,820,118 | B1 | 11/2004 | Leymann et al. |
| 6,859,783 | B2 | 2/2005 | Cogger et al. |
| 7,440,452 | B1 | 10/2008 | Giniger et al. |
| 7,493,518 | B2 * | 2/2009 | Anderson ........... H04L 41/5074 714/48 |
| 7,558,862 | B1 | 7/2009 | Tyukasz et al. |
| 7,620,707 | B1 | 11/2009 | Sutherland et al. |
| 7,734,799 | B1 | 6/2010 | Anka |
| 7,814,190 | B2 | 10/2010 | Kacin et al. |
| 7,818,427 | B2 | 10/2010 | Kacin et al. |
| 7,827,547 | B1 | 11/2010 | Sutherland et al. |
| 7,890,615 | B2 | 2/2011 | Kacin et al. |
| 7,941,599 | B2 | 5/2011 | Kacin et al. |
| 7,984,143 | B2 | 7/2011 | Sullivan |
| 8,042,169 | B2 | 10/2011 | Logigan et al. |
| 8,086,740 | B2 | 12/2011 | Tyukasz et al. |
| 8,103,751 | B2 | 1/2012 | Kacin et al. |
| 8,140,748 | B2 | 3/2012 | Kacin et al. |
| 8,161,162 | B1 | 4/2012 | Sutherland et al. |
| 8,195,797 | B2 | 6/2012 | Sullivan |
| 8,200,794 | B1 | 6/2012 | Sutherland et al. |
| 8,214,476 | B2 * | 7/2012 | Sullivan ............. H04L 41/0806 709/224 |
| 8,271,637 | B2 | 9/2012 | Sutherland et al. |
| 8,688,464 | B2 | 4/2014 | Sunday et al. |
| 2002/0026590 | A1 * | 2/2002 | Kusunoki ........... H04L 63/0807 726/10 |
| 2003/0110248 | A1 | 6/2003 | Ritche |
| 2003/0188117 | A1 | 10/2003 | Yoshino et al. |
| 2005/0010461 | A1 | 1/2005 | Manos |
| 2006/0282280 | A1 | 12/2006 | Stotz et al. |
| 2007/0094382 | A1 | 4/2007 | Ballard et al. |
| 2008/0120210 | A1 | 5/2008 | Leventhal |
| 2008/0307318 | A1 | 12/2008 | Sullivan |
| 2008/0313231 | A1 | 12/2008 | Kloba |
| 2009/0119147 | A1 | 5/2009 | Messer |
| 2009/0204955 | A1 | 8/2009 | Su et al. |
| 2010/0064299 | A1 | 3/2010 | Kacin et al. |
| 2010/0100778 | A1 | 4/2010 | Sullivan |
| 2010/0223368 | A1 | 9/2010 | Runcie et al. |
| 2010/0241736 | A1 | 9/2010 | Anka |
| 2011/0078676 | A1 | 3/2011 | Sutherland et al. |
| 2011/0145056 | A1 | 6/2011 | Sullivan et al. |
| 2011/0161123 | A1 | 6/2011 | Nrusimhan et al. |
| 2012/0011239 | A1 | 1/2012 | Svane et al. |
| 2012/0064875 | A1 | 3/2012 | Miller |
| 2012/0064880 | A1 | 3/2012 | Miller |
| 2012/0096172 | A1 | 4/2012 | Tyukasz et al. |
| 2012/0124185 | A1 | 5/2012 | Kacin et al. |
| 2012/0191802 | A1 | 7/2012 | Rodrigues |
| 2012/0191828 | A1 | 7/2012 | Rodrigues |
| 2012/0191829 | A1 | 7/2012 | Rodrigues |
| 2012/0198044 | A1 | 8/2012 | Sutherland et al. |
| 2012/0246479 | A1 | 9/2012 | Sutherland et al. |
| 2013/0086231 | A1 * | 4/2013 | Son ........................ H04L 67/55 709/221 |
| 2013/0238925 | A1 * | 9/2013 | Gerhart .................. G06Q 10/06 707/769 |

OTHER PUBLICATIONS

Notice of Allowance on U.S. Appl. No. 15/948,184 dated Jan. 4, 2021.
U.S. Notice of Allowance in U.S. Appl. No. 13/796,116, dated Oct. 8, 2015.
U.S. Notice of Allowance in U.S. Appl. No. 14/972,842, dated Nov. 28, 2017.
U.S. Office Action in U.S. Appl. No. 13/796,116, dated Oct. 14, 2014.
U.S. Office Action in U.S. Appl. No. 13/796,116, dated Feb. 5, 2015.
U.S. Office Action in U.S. Appl. No. 13/796,116, dated Jul. 20, 2015.
U.S. Office Action in U.S. Appl. No. 14/972,842, dated Dec. 15, 2016.
U.S. Office Action in U.S. Appl. No. 14/972,842, dated Aug. 1, 2017.

* cited by examiner

ConnectWise Plugin
File  Options

| CONNECTION |
| Server Connection — Plugin Version: 6.0.0.30

SYNCHRONIZATION
- Company Sync — Synced: Yes
- Contact Sync — Synced: Yes
- Ticket Sync — Synced: Yes
- Asset Sync — Synced: Yes ASSET MANAGEMENT
- Agreement Mapping — Clients Billed: 6 / 6

TICKET MANAGEMENT
- Service Boards — Imported Boards: 4
- Ticket Status — Mapped : LT(20/20) | CW(56/56)
- Ticket Priority — Priorities Mapped: 20
- Ticket Category
- Streamlining MISCELLANEOUS
- Informational Messages
- Data Usage
- System Check
- Opportunities Service Board Priority Mapping — 2201

| LabTechPriority | ConnectWise Priority |
|---|---|
| Ignore | Priority 5 - No SLA |
| Lowest | Priority 4 - Low |
| Super Low | Priority 4 - Low |
| Very Low | Priority 4 - Low |
| Low | Priority 4 - Low |
| Not so Low | Priority 4 - Low |
| Kinda Important | Priority 3 - Medium |
| Slightly Important | Priority 3 - Medium |
| Abnormally Below Normal | Priority 3 - Medium |
| Below Normal | Priority 3 - Medium |
| Normal | Priority 3 - Medium |
| Above Normal | Priority 3 - Medium |
| Important | Priority 3 - Medium |
| Very Important | Priority 2 - High |
| High | Priority 2 - High |
| Very High | Priority 2 - High |
| Urgent | Priority 2 - High |
| Critical | Priority 2 - High |
| Super Critical | Priority 1 - Critical |
| Emergency | Priority 1 - Critical |

2202

Save  2203
Cancel

1910

GENERAL, FLEXIBLE, RESILENT TICKETING INTERFACE BETWEEN A DEVICE MANAGEMENT SYSTEM AND TICKETING SYSTEMS

CROSS-REFERENCES TO RELATED APPLICATIONS

This application claims the benefit of priority under 35 U.S.C. § 120 as a continuation of U.S. patent application Ser. No. 15/948,184, filed Apr. 9, 2018, which claims the benefit of priority under 35 U.S.C. § 120 as a continuation of U.S. patent application Ser. No. 14/972,842, filed Dec. 17, 2015, which claims the benefit of priority under 35 U.S.C. § 121 as a divisional of U.S. patent application Ser. No. 13/796,116, filed Mar. 12, 2013, each of which is hereby incorporated herein by reference in its entirety.

FIELD OF THE DISCLOSURE

The present disclosure generally relates to the use of device management systems to facilitate the management of computing devices. More specifically, the present disclosure relates to the use of ticketing systems with a ticketing interface that improves the process of ticketed device management.

BACKGROUND OF THE INVENTION

Managed Service Providers (MSPs) use device management systems to automate the management of their client devices. MSPs can also use ticketing systems to manage their own internal processes. There is some overlap between the information generated and used by device management systems and ticketing systems, Existing interfaces duplicate this common information manually, which introduces errors.

SUMMARY OF THE INVENTION

Systems and methods of the present disclosure facilitate synchronizing data between a device management system and ticketing systems. For example, the present disclosure provides an automated interface between device management systems and ticketing systems that is configured to bi-directionally transfer information between the systems. The automated interface allows the system to be configured responsive to specific business needs, maintains flexibility so various ticketing systems can be used, and compensates for errors introduced into the overall system by, e.g., differences in various interfacing systems and/or user errors and limitations.

At least one aspect of the present disclosure is directed to a system for synchronizing data between a device management system and a ticketing system. In some embodiments, the system includes an update module, a mapping module, and a service board selection module. The update module can be configured to update ticketing information associated with a first type of ticket, such as a ticketing ticket of the ticketing system. The ticket information can be updated to match device management information associated with a second type of ticket, such as a device management ticket of the device management system. The mapping module can be configured to select a ticket category for a device management ticket on the device management system responsive to the device management information about the device management ticket. The service board selection module may be configured to select a service board for a ticketing ticket on the ticketing system.

In some embodiments, the system includes a detection module. The detection module may be configured to test the device management information for consistency with the ticketing information.

In some embodiments, the system includes a resolution module. The resolution module may be configured to repair issues with the device management information and ticketing information when the test for consistency fails.

At least one aspect of the present disclosure is directed to a method for synchronizing data between a device management system and a ticketing system. The method can include receiving, by an update module executing on at least one processor of a server communicatively coupled to the device management system and the ticketing system, ticket information associated with a ticketing ticket from the ticketing system. The method can also include receiving, by the update module from the device management system, device management information associated with a device management ticket. In some embodiments, the method includes comparing, by the update module, the ticketing information with the device management information. Responsive to the comparison, the method can include updating the ticketing information so it substantially matches the device management information. In some embodiments, the method can include identifying, by a mapping module executing on the server, a ticket category of the device management ticket based on the device management information. The method can include selecting, by a service board selection module executing on the server, a service board for the ticketing ticket responsive to the identified ticket category.

BRIEF DESCRIPTION OF THE DRAWINGS

FIG. 19 is an illustrative example of an embodiment of a user interface for an overall view of a ticketing interface.

FIG. 21 is an illustrative example of an embodiment of a user interface for display and modification of ticket categories.

FIG. 22 is an illustrative example of an embodiment of a user interface for display and modification of ticket priorities.

DETAILED DESCRIPTION

Systems and methods of the present disclosure facilitate synchronizing data between a device management system and ticketing systems. For example, the device management system stores control and status information about the devices under management and the clients, which can be entered and/or modified by a user via a client management interface. An MSP can use a ticketing system to manage and respond to information relevant to managed devices and their end users. This information can be in the form of a ticket and include information about an issue or task that needs to be addressed by the MSP. An end user can directly enter a ticket into the ticketing system, or modify an existing ticket, by using a device to access a client ticket interface.

Since information stored in the device management system and the ticketing system can vary, fall out of synchronization, and/or be in different formats, the ticketing interface can synchronize relevant information between the device management database and the ticketing database. For example, the ticketing interface allows for information that is collected by the device management system to appear in the ticketing system, or information that is collected by the ticketing system to appear in the device management database.

Furthermore, by managing and synchronizing this information among various systems, systems and methods of the present disclosure can utilize the information to provide additional business support services. For example, an MSP can obtain, via the ticketing interface, information related to call times and response times, accuracy of estimates by operations, effectiveness of individual employees, financial status of the business.

Figure 1:
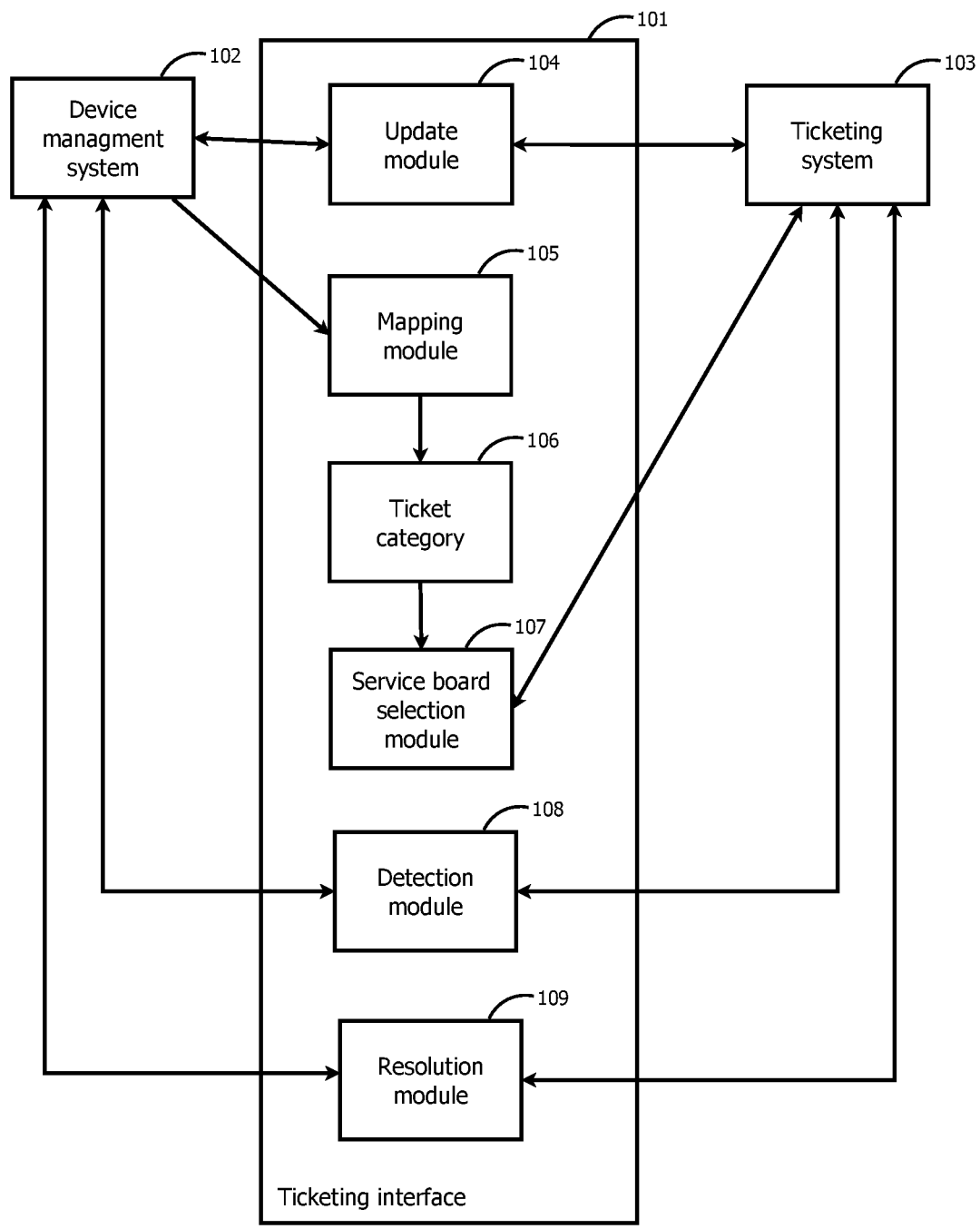
FIG. 1 is an illustrative block diagram of an embodiment of a ticketing interface.

FIG. 1 illustrates a block diagram of a ticketing interface 101. In brief overview, the ticketing interface synchronizes data between a device management system 102 and a ticketing system 103. The system associated with the ticketing interface can include an update module 104 that provides updates to both the device management system 101 and the ticketing system 103 to achieve this synchronization. The system can include a mapping module 105 that generates a ticket category 106 from device management information on the device management system 102. The system can include a service board selection module 107 that uses the ticket category 106 to select a service board for the ticketing ticket in order to facilitate management of the ticket on the ticketing system 103. The system can include a detection module 108 that periodically runs consistency tests on the device management system 102 and the ticketing system 103. In some embodiments, the system can include a resolution module 109, which the detection module 108 can invoke upon finding an inconsistency. The resolution module 109 can correct the problem due to the inconsistency by updating the device management system 102 and the ticketing system 103.

Still referring to FIG. 1, and in further detail, the update module 104 can receive ticketing information associated with a ticketing ticket. The update module 104 can receive the ticketing information via the ticketing interface 101 or network. In some embodiments, the ticketing system 103 provides the ticket or ticketing information to the update module 104, and in some embodiments the update module 104 obtains the ticket from the ticketing system 103. In some embodiments, the update module 104 can obtain, receive or request the ticket information responsive to a condition, event, or user indication. For example, the update module 104 can receive the ticket responsive to an end user submitting a ticket. In another example, the update module 104 can receive a ticket in response to an end user modifying a ticket. In yet another example, the update module 104 can receive the ticket in response to the system identifying a discrepancy, event, or condition occurring with respect to a device management ticket or managed device.

In some embodiments, the update module 104 receives device management information associated with a device management ticket from a device management system 102 via the ticketing interface 101 or the network. In some embodiments, the device management system 102 provides the device management ticket or device management information to the update module 104, and in some embodiments the update module 104 obtains the device management ticket or device management information from the device management system 102. In some embodiments, the update module 104 can obtain, receive or request the device management information responsive to a condition, event, or user indication. For example, the update module 104 can receive the device management information responsive to an end user submitting a ticket. In another example, the update module 104 can receive a device management ticket in response to an end user modifying at least one of a ticketing ticket and a device management ticket. In yet another example, the update module 104 can receive the device management information in response to the system identifying a discrepancy, event, or condition occurring with respect to a ticketing ticket or managed device.

In some embodiments, the update module 104 can compare the ticketing information received from the ticketing system with the device management information received from the device management system. For example, the update module 104 can parse the ticketing information and the device management information to identify the differences or similarities. In some embodiments, the update module 104 compares a field of the ticketing ticket with the corresponding field of the device management ticket to determine whether the values of the field are the same or different. For example, the update module 104 can compare strings of the fields, binary values, numerical values, etc.

In some embodiments, the update module 104 identifies that the ticketing ticket and the device management ticket include the same fields, and then compares the values of the fields. If the update module 104 determines, based on the comparison, that the values of the fields are different, the update module 104 may update one of the ticketing information and the device management information. For example, the update module 104 may identify a timestamp associated with each of the ticketing information and device management information, or a specific field thereof, and identify the most current information. Upon identifying the most current information, the update module 104 can retrieve the current information and use it to update the ticketing information or the device management information, whichever is older.

In other embodiments, the update module 104 may use other criteria to determine which information should be used to update the ticketing or device management information. For example, the update module 104 may identify which information has been validated by the system, end user, or MSP device. In other embodiments, the update module 104 may always update the ticketing ticket information with the device management ticket information, or vice versa. In some embodiments, a user of the system or MSP may configure an aspect of the update module 104.

Upon identifying the information that needs to be updated and the information that should be used to perform the update, the update module can perform the update so at least the updated field substantially matches.

Figure 13A:
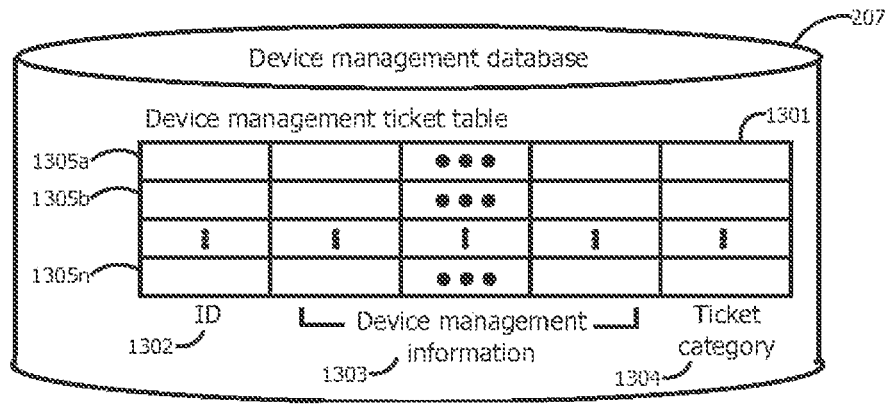
FIGS. 13A-C are illustrative block diagrams of embodiments of ticket categories.
Figure 13B:
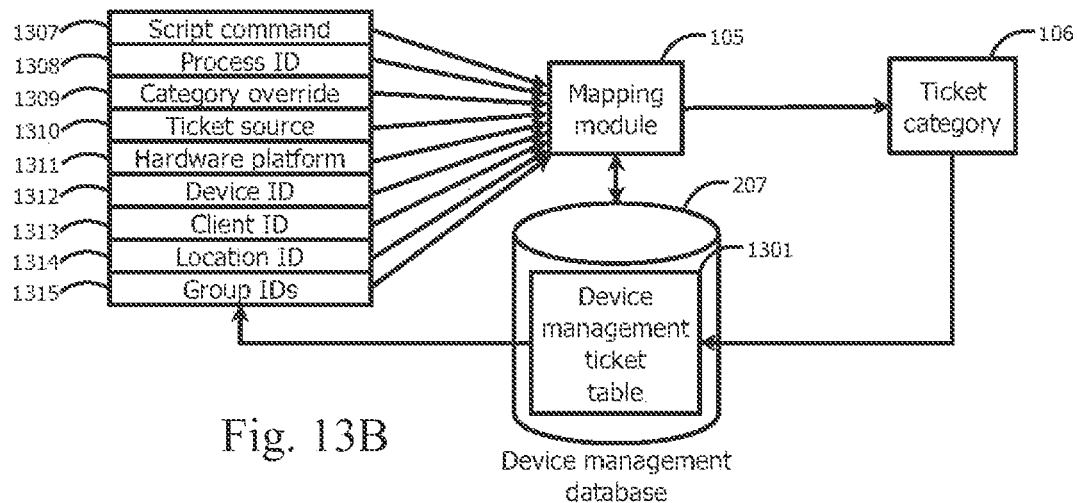

In some embodiments, the system includes a mapping module that can analyze or parse the device management information, before being updated or after being updated, to identify a ticket category (e.g., Anti-Virus, Backup, Database, Diagnostic-Check, Disk Drive, E-mail problems, EventLogs, General Questions, Hardware, How Do I, etc.) of the device management ticket, which is discussed further with respect to FIG. 13b.

In some embodiments, the system includes a service board selection module configured to select a service board (e.g., Managed Services, Support Desk, etc.) for the ticketing ticket in response to the identified ticket category.

Figure 2:
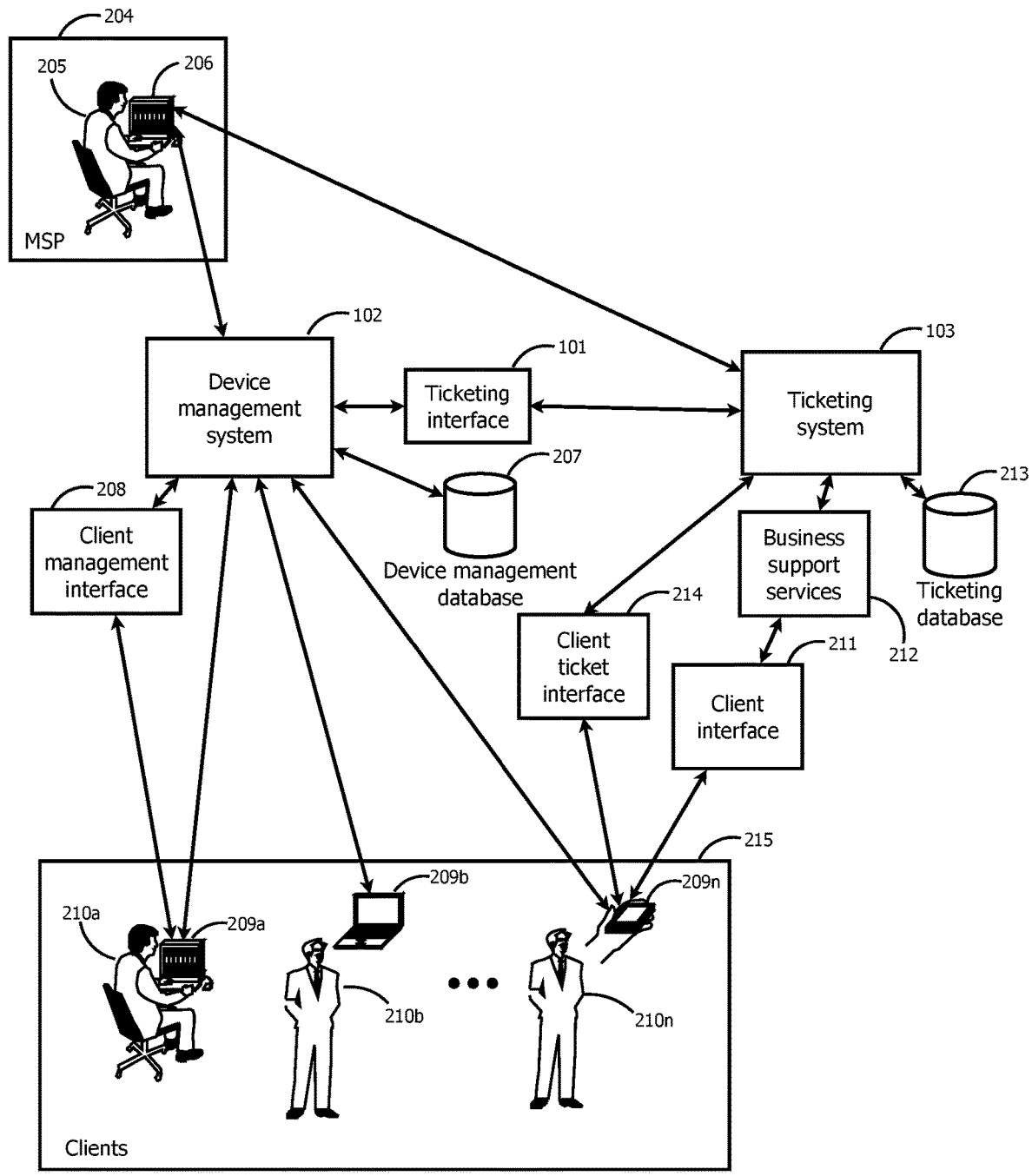
FIG. 2 is an illustrative block diagram of an embodiment of an interface between a device management system and a ticketing system.

FIG. 2 illustrates a block diagram of the components used by an MSP 204 to manage a set of devices 209. An employee 205 at the MSP 204 uses a device 206 to access a user interface on a device management system 102 and a user interface on a ticketing system 103. The device management system 102 is connected through a network to the devices under management 209 of the clients 215, which can be used by end users 210. The device management system 102 uses a device management database 207 to store control and status information about the devices under management 209 and the clients 215. Some of the information about the devices under management 209 and the clients 215 is stored in the device management database 207 as device management tickets. An end user, exemplified in FIG. 2 by user 210a, can add or modify device management ticket information on the device management system 102 by using a device, exemplified in FIG. 2 by device 209a, to access a client management interface 208. The client management interface 208 can add or modify device management ticket information that is stored in the device management database 207 on the device management system 102.

The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The device management system 102, ticketing system 103, devices 206, and devices under management 209 can include at least one logic device such as a computing device having a processor to communicate via the network, for example with client device 209 or MSP device 206. The systems 102 and 103 can include at least one server. For example, the device management system 102 and ticketing system 103 can include a plurality of servers located in at least one data center. In some embodiments, the ticketing system 102, device management system 103, or ticketing interface 101 can include or communicate with at least one of the update module 104, mapping module 105, service board selection module 107, detection module 108, and resolution module 109. The update module 104, mapping module 105, service board selection module 107, detection module 108, and resolution module 109 can each include at least one processing unit or other logic device such as a programmable logic array engine. The update module 104, mapping module 105, service board selection module 107, detection module 108, and resolution module 109 can be separate components, a single component, part of the device management system 102, part of the ticketing system 103, or an independent entity.

The one or more servers associated with the device management system 102, ticketing system 103, ticketing interface, or MSP device 206 do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node.

The system and its components, such as a device management system 102, ticketing system 103 and modules 104, 105, 107, 108 and 109, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The MSP 204 uses the ticketing system 103 to manage and respond to information about the devices under management 209 and their end users 210. The ticketing system 103 uses a ticketing database 213 to store and update information relevant to the devices 209 and their end users 210, in the form of ticketing tickets. The ticketing tickets contain ticketing information about an issue or task that should be addressed by the MSP 204. An end user, exemplified in FIG. 2 by user 210n, can directly enter or modify a ticket into the ticketing database 213 by using a device, exemplified in FIG. 2 by 209n, to access a client ticket interface 214. The client ticket interface 214 accesses the ticketing system 103 to add or modify ticketing information in the ticketing database 213.

The ticketing interface 101 synchronizes relevant information between the device management database 207 and the ticketing database 213. In this way, information that is collected by the device management system 102 appears in the ticketing database 213, and information that is collected by the ticketing system 103 appears in the device management database 207. As an illustrative example, this can enable additional business support services 212 on the ticketing system 103. These business support services 212 can be accessed and utilized by the MSP 204 using a device 206 to access the ticketing system 103 through a user interface. A client-oriented version of the business support services 212 can be accessed by an end user, exemplified in FIG. 2 by user 210n, using a device, exemplified in FIG. 2 by device 209n, through a client interface 211.

Figure 3:
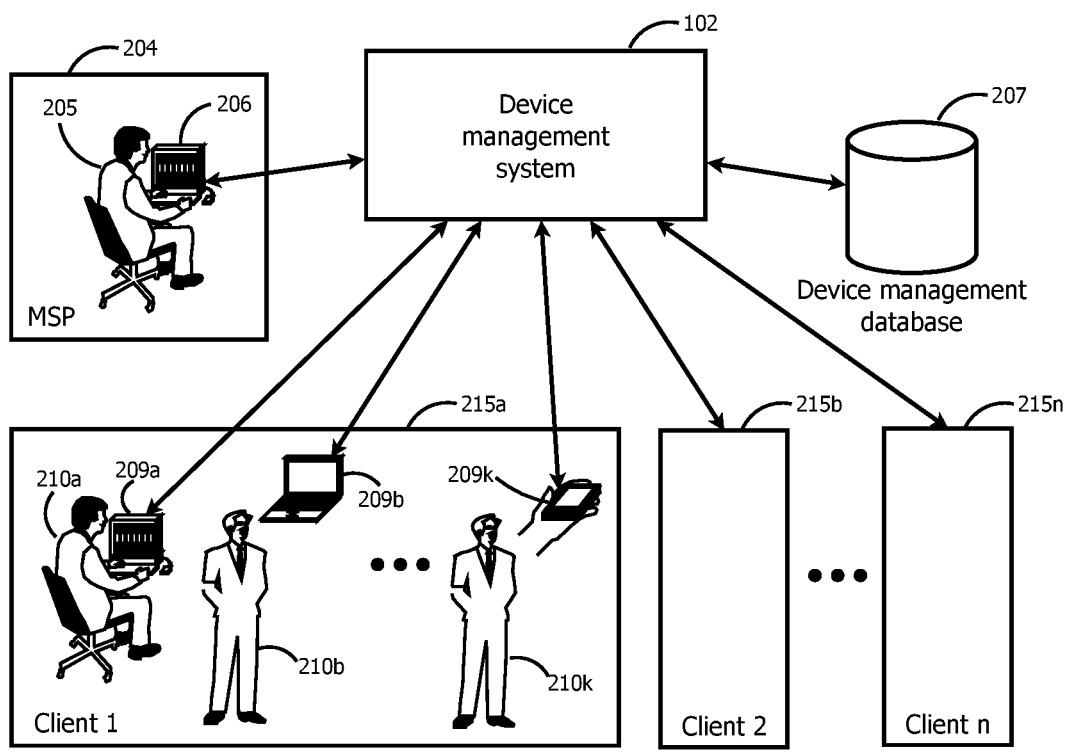
FIG. 3 is an illustrative block diagram of an embodiment of an MSP providing services to multiple clients.

FIG. 3 illustrates a block diagram of an MSP 204 providing services to multiple clients 215. In some embodiments, an employee 205 or other agent or entity at an MSP 204 can use a device 206 connected to the device management system 102. The employee 205 can use the device management system 102 to provide monitoring or management functions to devices under management. Each client 215 has one or more devices under management 209. FIG. 3 illustrates this for client 215a with devices under management 209a-209k. Device 209a is exemplified as a desktop machine, device 209b is exemplified as a laptop machine, and device 209k is exemplified as a mobile device. Each device 209a-209k may be used by an end user 210a-210k that benefits directly from the monitoring and management functions. Each device 209a-209k connects to the device management system 102 through a network to retrieve and execute management functions and to report monitoring results. This structure is similar at all clients 215. The device management database 207 is used to keep track of the partitioning of devices by client, as will be shown in FIG. 4. The device management system 102 uses the device management database 207 to help the employee 205 visualize activities by clients, and facilitate management of the clients one at a time. The device management system 102 also allows the MSP 204 to consolidate actions and results from all clients 215 to make the servicing of multiple clients much more efficient. In addition, the device management system 102 is "multi-tenanted", which allows each of the clients 215 to access and use the device management system 102 without being aware of any of the other clients.

Figure 4:
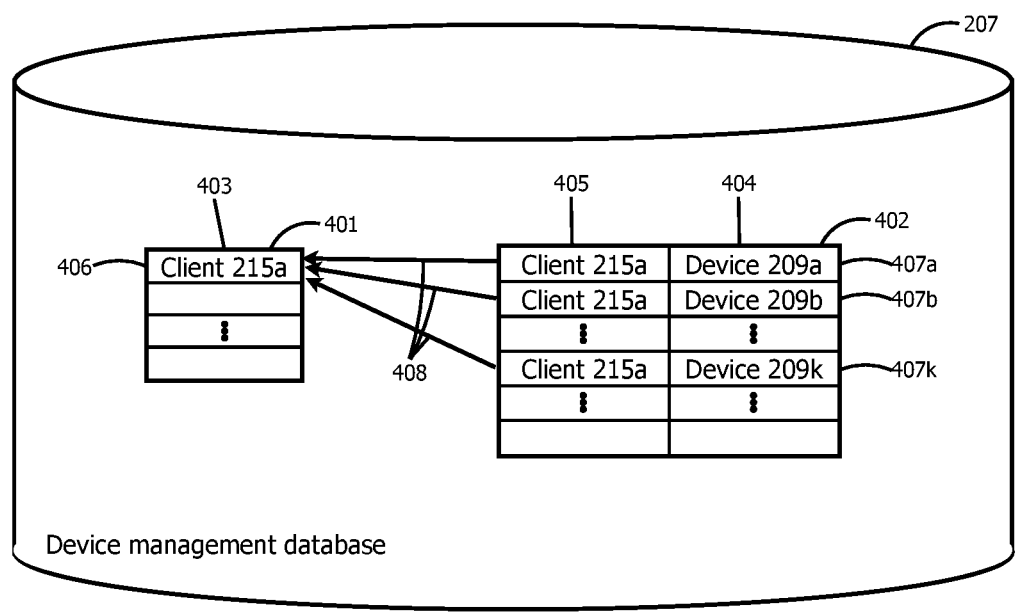
FIG. 4 is an illustrative block diagram of an embodiment of tables in a database.

FIG. 4 illustrates a block diagram of the tables 401 and 402 in the device management database 207 that are used to keep track of the partitioning of devices by client. Each row of table 401 represents one client, and has one column 403 that references clients. Each row of table 402 represents a single device and has one column 404 that references the device, and one column 405 that reference the client where the device is located. Other table and row formats or data structure can be used to store, display or manipulate this information. As exemplified in FIG. 4, client 215a has a row 406 in table 401, and devices 209a-209k each have a row 407a-407k in table 402 that references the device in column 404 and references client 215a in column 405. A client can have multiple devices, as shown by the many-to-one relationship 408 between table 402 and table 401.

Figure 5:
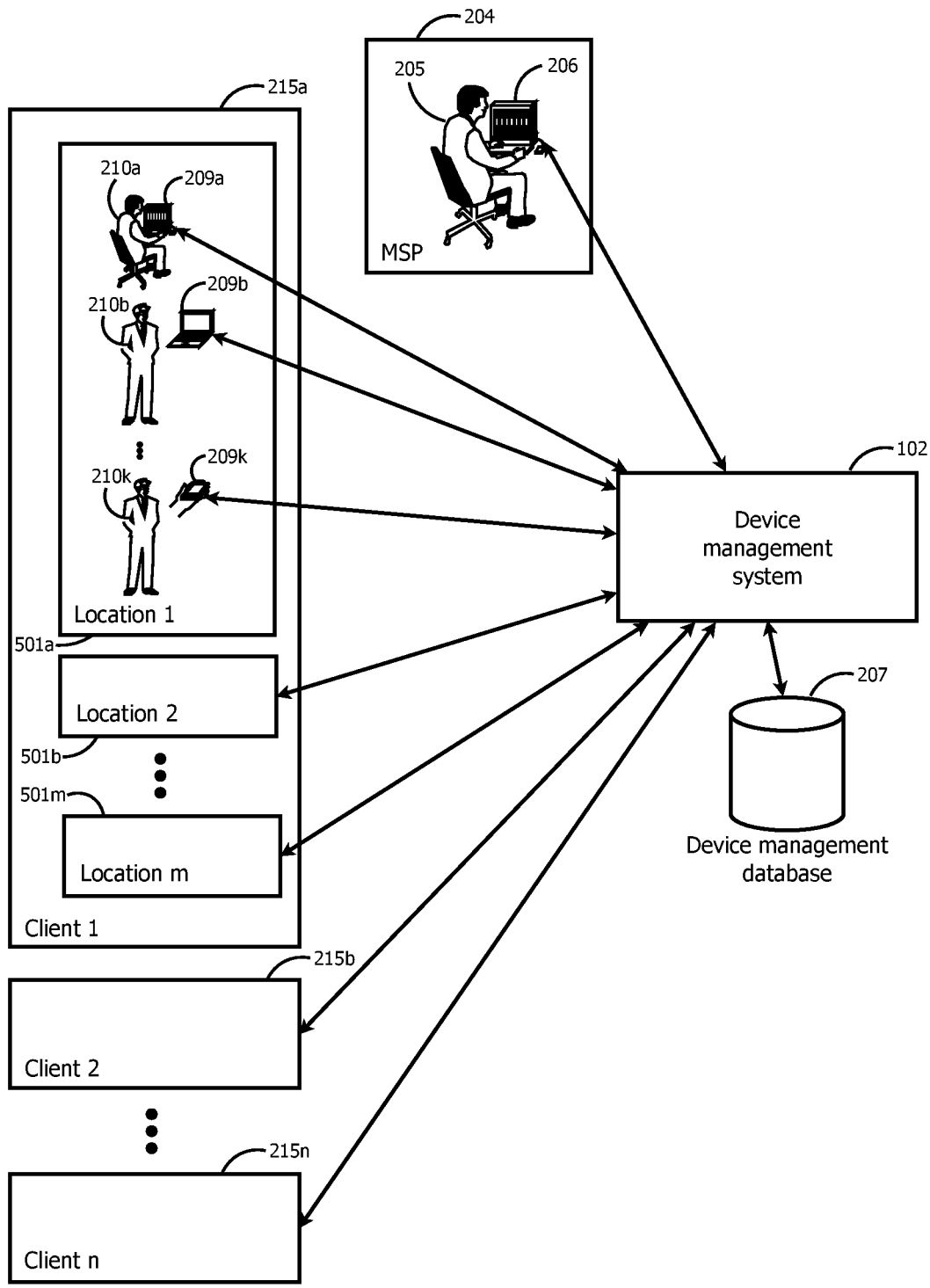
FIG. 5 is an illustrative block diagram of an embodiment of the organization of devices into locations.

FIG. 5 illustrates a block diagram of the additional organization of devices into locations. A location represents a group of related devices within a client. In one embodiment, the organization of devices uses different clients to represent different companies, and uses locations to represent different offices within a single company. In some embodiments, an employee, agent or entity may indicate their location to the MSP. In some embodiments, the device can include a location device such as a Global Positioning System ("GPS") to obtain geographic information and communicate the geographic information to an MSP. In another embodiment, the location may be obtained via IP address lookup, Wi-Fi locating, cell tower triangulation, etc.

An employee 205 at an MSP 204 uses a device 206 connected through a network to the device management system 102. The employee 205 uses the device management system 102 to provide monitoring and management functions to devices under management 209. The clients 215 are each internally organized into one or more locations 501. In FIG. 5 this is exemplified by client 215a being made up of locations 501a-501m. Each location has one or more devices, as exemplified in FIG. 5 by location 501a having devices 209a-209k. The devices can comprise a mix of types, as exemplified by device 209a as a desktop machine, device 209b as a laptop machine, and device 209k as a mobile device. Each device 209a-209k may be used by an end user 210a-210k that benefits directly from the monitoring and management functions. Each device 209a-209k connects through a network to the device management system 102 to retrieve and execute management functions and to report monitoring results. In some embodiments, this structure is similar at all locations 501, and the entire structure of locations and devices is similar at all clients 215. The device management database 207 can keep track of the partitioning of devices by client and location, as will be shown in FIG. 6. The device management system 102 uses the device management database 207 to help the employee 205 visualize activities by client and location, and facilitate both the management of locations one at a time and the management of all locations of a single client. The device management system 102 allows the MSP 204 to consolidate actions and results from all locations 501a-501m within a single client 215a, to make servicing of large clients more efficient, and also allows the MSP 204 to consolidate actions and results from all clients 215, to make servicing of multiple clients much more efficient. In addition, the device management system 102 is "multi-tenanted", which allows each of the clients 215 to access and use the device management system 102 without being aware of any of the other clients.

Figure 6:
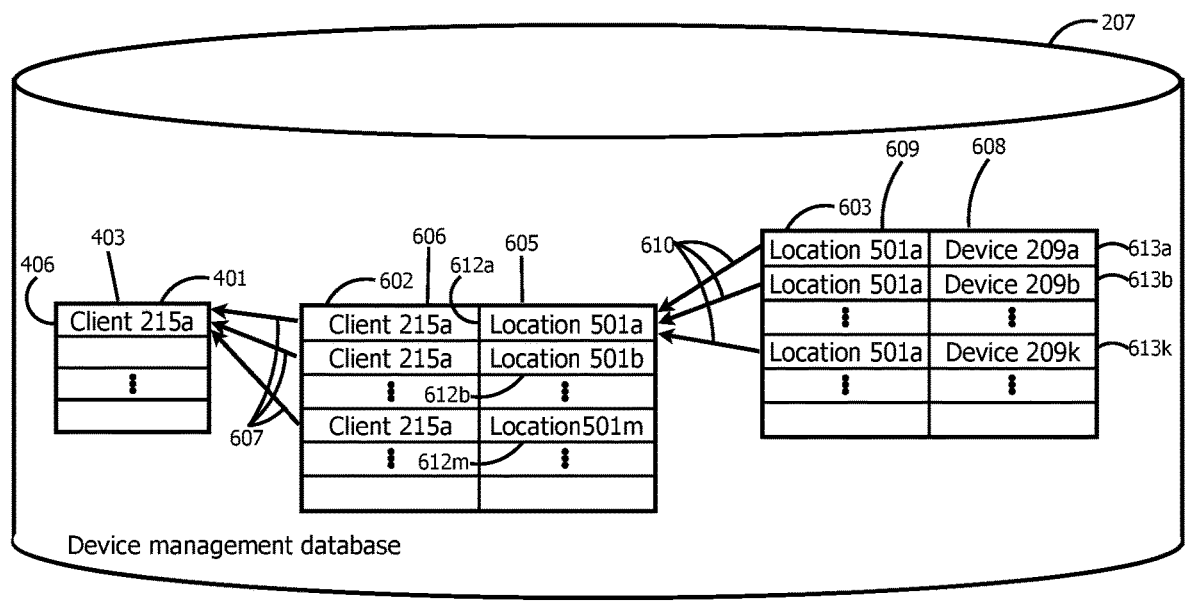
FIG. 6 is an illustrative block diagram of an embodiment of tables in a database.

FIG. 6 illustrates a block diagram of the tables 401, 602, and 603 in the device management database 207 that are used to keep track of the partitioning of devices by client and location. Each row of table 401 represents one client, and has one column 403 that references clients. Each row of table 602 represents a single location and has one column 605 that references the location, and one column 606 that references the client where the location is located. As exemplified in FIG. 6, client 215a has a row 406 in table 401, and locations 501a-501m each have a row 612a-612m in table 602 that references the location in column 605 and references client 215a in column 606. A client can have multiple locations, as shown by the many-to-one relationship 607 between table 602 and table 401. Each row of table 603 represents a single device and has one column 608 that references the device, and one column 609 that references the location where the device is located. As exemplified in FIG. 6, devices 209a-209k each have a row 613a-613k in table 603 that references the device in column 608 and references location 501a in column 609. A location can have multiple devices, as shown by the many-to-one relationship 610 between table 603 and table 602.

Figure 7:
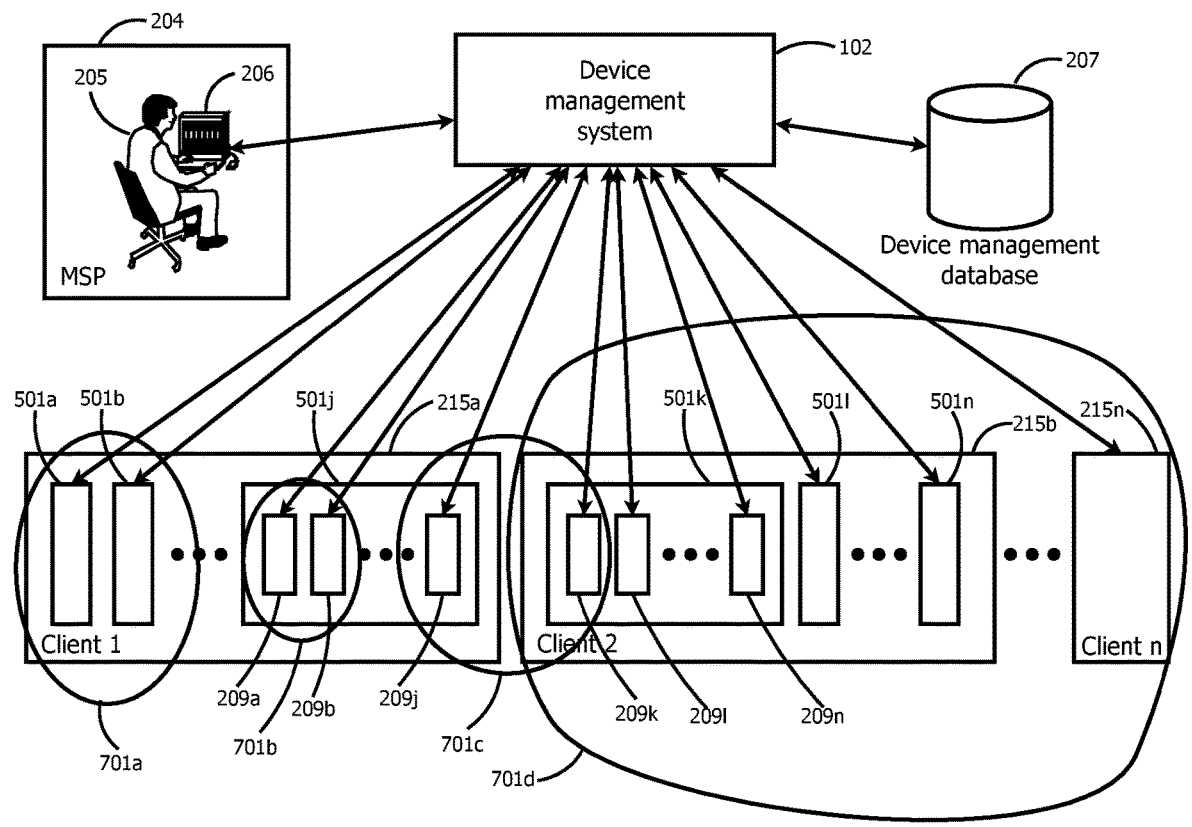
FIG. 7 is an illustrative block diagram of an embodiment of the use of groups.

FIG. 7 illustrates a block diagram of the use of groups as a powerful and flexible method for organizing devices for management, and exemplifies several typical uses of these groups. An employee 205 at an MSP 204 uses a device 206 connected through a network to the device management system 102. The MSP 204 uses the device management system 102 to provide management services to multiple clients 215. The device management system 102 uses the device management database 207 to keep track of the structure and content of groups, as will be shown in FIG. 9. Each client has one or more locations, as exemplified by locations 501a-501j for client 215a, and locations 501k-501n for client 215b. Each location has one or more devices, as exemplified by devices 209a-209j for location 501j, and by devices 209k-209n for location 501k.

The employee 205 defines groups of devices that can encompass any arbitrary set of one or more devices. The utility of these groups derives from the way in which they are defined. Once a group is defined, the employee 205 can apply management actions, or group reporting results, from all the devices in the group as a single unit. FIG. 7 illustrates several groups that exemplify some common useful definitions of groups. Note that these groups are not meant to be limiting, but are instead used to illustrate the concept and utility of groups. Group 701a contains all of the devices in locations 501a and 501b. This group exemplifies a situation where locations represent departments in a single office, and the group is used to manage the entire office as a unit. Group 701b contains the devices 209a and 209b. This group exemplifies a situation where devices in the group are all the devices at one office that are used for testing, so the update policy must be managed differently from most machines, in order not to disrupt the testing process. Group 701c contains devices 209j and 209k from more than one location. This group exemplifies a situation in which the group defines all the devices that are Android smart phones, and the group is used to implement specific management tasks that need to be applied to all Android smart phones, regardless of where they are. Group 701d contains all of the devices in clients 215b and 215n. This group exemplifies a situation in which the MSP 204 provides a higher class of service to clients that pay more for the service, and the group is used to manage the devices that are covered by that class of service.

Devices can be in more than one group. In FIG. 7, device 209k is in both group 701c and group 701d. This can lead to potential ambiguities when certain management configurations are applied to group 701c, and different conflicting management configurations are applied to group 701d. In order to avoid this ambiguity, the device management system 102 follows specific rules about the order in which management configurations are applied to multiple groups, and how they override each other for devices that are in more than one group. In one embodiment, the device level configuration for group 701c overrides the client level configuration for group 701d. This is useful in a situation where group 701d is used to apply updates twice a week, for a higher level of service, but group 701c is used to apply security updates on server machines to once per day for all clients, since server machines are more vulnerable to external attacks.

Figure 8:
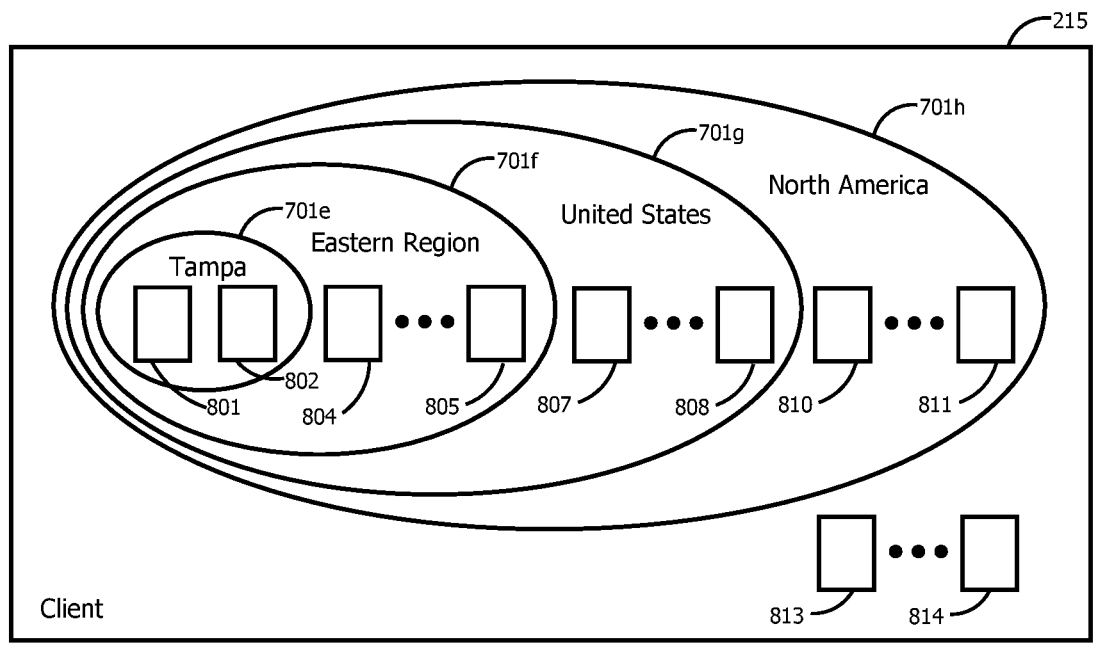
FIG. 8 is an illustrative block diagram of an embodiment of hierarchies of groups.

FIG. 8 illustrates a block diagram of hierarchies of groups and how they are useful for management and reporting functions. A large multi-national company is shown, in which two locations 801 and 802 represent two offices in the city of Tampa. These locations are members of group 701e, which represents the city of Tampa. Group 701e, along with other locations 804-805 makes up the Eastern Region, which is represented by group 701f. Continuing in this fashion, group 701f, along with additional locations 807-808, make up the United States, which is represented by group 701g. Group 701g, along with additional locations 810-811, makes up the North American region, which is represented by group 701h. Group 701h, along with additional locations 813-814, make up the entire company, which is represented as client 215. In this way, the structure of the company is represented explicitly, and is available in a hierarchical display in the management system. This is of great use to the MSP in many ways, including management, reporting, and billing. Groups do not need to be hierarchical in this way, and in fact, hierarchical groups as shown in FIG. 8 can exist side by side with non-hierarchical groups as shown in FIG. 7.

Figure 9:
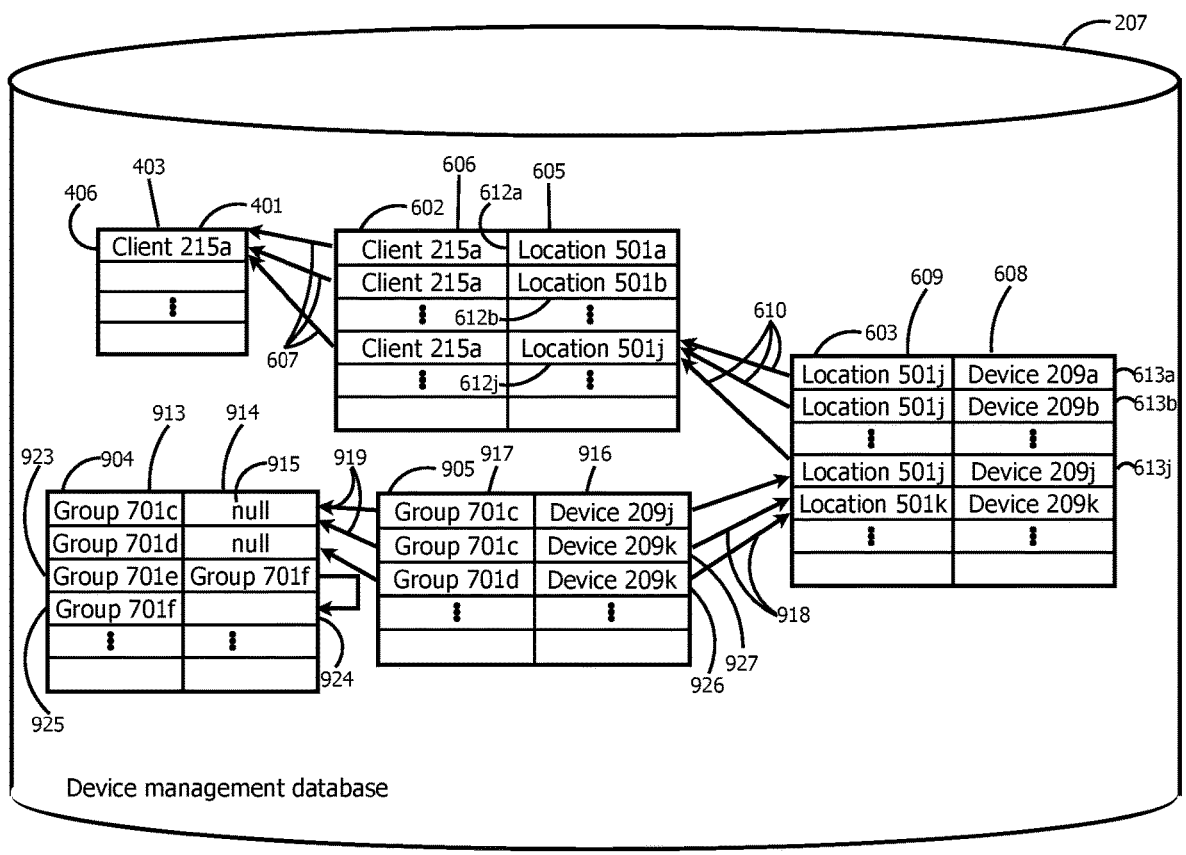
FIG. 9 is an illustrative block diagram of an embodiment of tables in a database.

FIG. 9 illustrates a block diagram of the tables 401, 602, 603, 904, and 905 in the device management database 207 that are used to keep track of the structure and content of groups. Each row of table 401 represents a single client, and has one column 403 that references clients. Each row of table 602 represents a single location and has one column 605 that references the location, and one column 606 that references the client where the location is located. As exemplified in FIG. 9, client 215a has a row 406 in table 401, and locations 501a-501j each have a row 612a-612j in table 602 that references the location in column 605 and references client 215a in column 606. A client can have multiple locations, as shown by the many-to-one relationship 607 between table 602 and table 401. Each row of table 603 represents a single device and has one column 608 that references the device, and one column 609 that references the location where the device is located. As exemplified in FIG. 9, devices 209a-209j each have a row 613a-613j in table 603 that references the device in column 608 and references location 501j in column 609. A location can have multiple devices, as shown by the many-to-one relationship 610 between table 603 and table 602.

Tables 904 and 905 represent the structure and content of the groups themselves. Each row of table 904 represents one group and has one column 913 that references the group, and one column 914 that references the parent group. For a group that is in a hierarchy, column 914 refers to the group one level up in the hierarchy. In one embodiment, the entry 923 for the Tampa group 701e has a reference in column 914 that refers 924 to the entry 925 for the Eastern Region group 701f. For a group that is at the top level of the hierarchy, or not in any hierarchy, column 914 has a special "null" value 915 indicating that there is no parent group. Each row of table 905 represents the membership of a single device in a single group, and has one column 916 that references the device, and one column 917 that references the group. As exemplified in FIG. 9, device 209k is in both group 701c and 701d, so one row 926 of table 905 references device 209k in column 916 and group 701d in column 917, and another row 927 of table 905 references device 209k in column 916 and group 701c in column 917. A single device can be in more than one group by appearing in column 916 of more than one row of table 905, as shown by the many-to-one relationship 918 between table 905 and table 603. A single group can contain more than one device by appearing in column 917 of more than one row of table 905, as shown by the many-to-one relationship 919 between table 905 and table 904.

Figure 10:
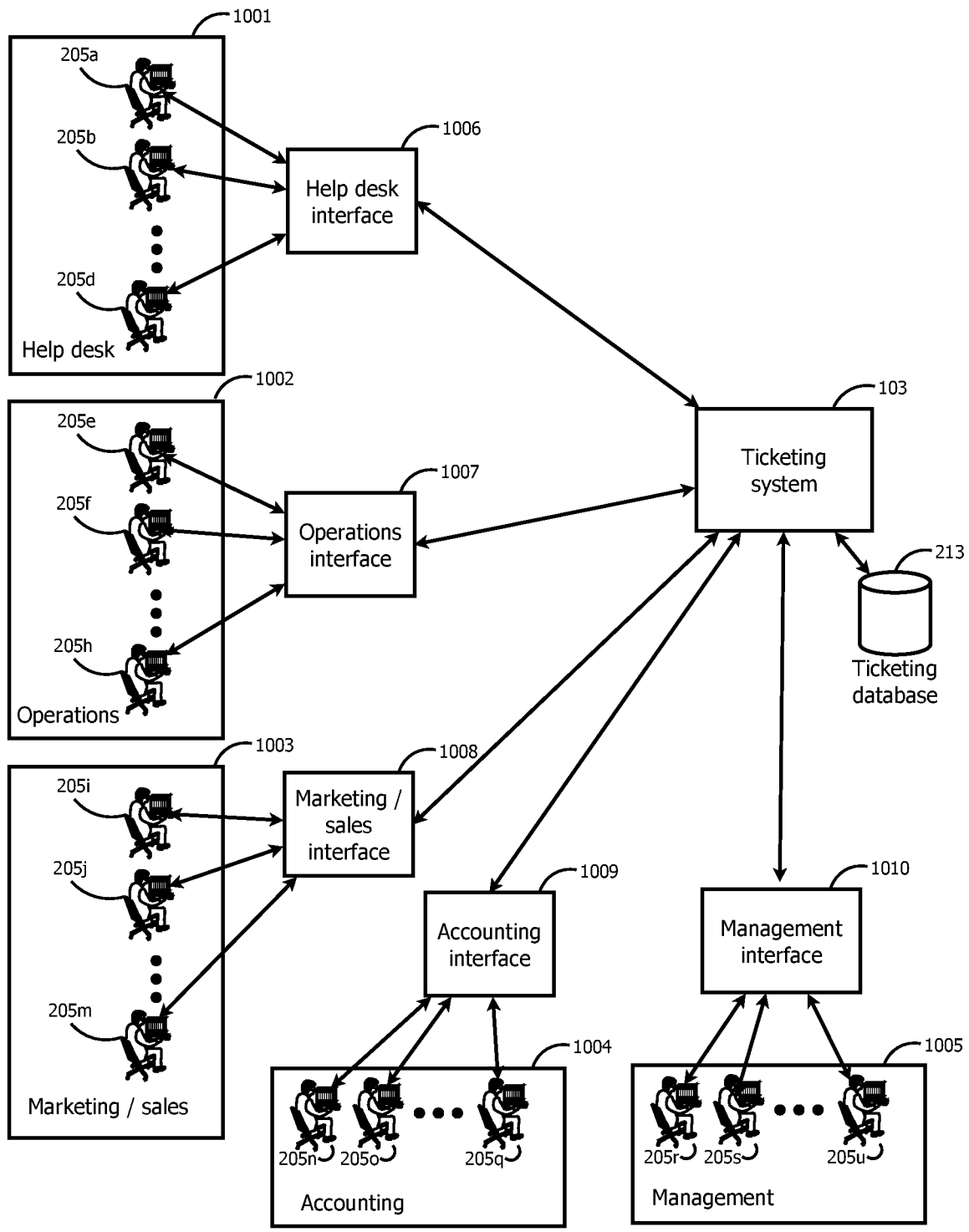
FIG. 10 is an illustrative block diagram of an embodiment of the use of a ticketing system within an MSP.

FIG. 10 illustrates a block diagram of the use of a ticketing system 103 to automate and manage the workflow of the MSP 204. The ticketing system 103 uses its ticketing database 213 to provide a help desk interface 1006, an operations interface 1007, a marketing/sales interface 1008, an accounting interface 1009, and a management interface 1010. Note that FIG. 10 is meant to be illustrative, and not restrictive, so other embodiments of the ticketing system 103 provide other interfaces not shown in FIG. 10.

The help desk interface 1006 is used by employees 205a-205d working at the help desk 1001 to provide on-demand assistance to clients. The ticketing system 103 is used to enter issues as they are received from clients and track them through their stages of research and resolution. The ticketing system 103 also facilitates the cooperation of multiple employees in the help desk 1001 in order to resolve an issue.

The operations interface 1007 is used by employees 205e-205h working in operations 1002 to manage installations, modifications, and updates to the system hardware and system software of devices used by clients. The ticketing system 103 allows requests for these operations to originate from clients, internally, as the result of a resolution by the help desk 1001, or as the result of a decision by the marketing/sales group 1003 or the management team 1005.

The marketing/sales interface 1008 is used by employees 205i-205m in marketing/sales 1003 to assist in managing the sales process. The ticketing system 103 gives the marketing/sales staff 1003 more visibility into client requests, client needs, and sales opportunities.

The accounting interface 1009 is used by employees 205n-205q in accounting 1004 to improve the accuracy and efficiency of the ordering, invoicing, and collection processes. Information about billable time used by the help desk 1001 and operations 1002 is obtained from the ticketing system 103, as well as equipment that is installed by operations 1002.

The management interface 1010 is used by company management 205r-205u to get a good overall view of the operation of the company. The ticketing system 103 provides valuable information such as the call times and response times of the help desk 1001, the accuracy of estimates by operations 1002, and the effectiveness of generating and closing opportunities and leads by marketing/sales 1003. The ticketing system 103 also provides some metrics on the effectiveness of individual employees 205. Since the ticketing system 103 contains information about each business transaction of the company, it provides information about the financial status of the business. All of this information is extremely valuable to the management team 1005 in making informed decisions about running the MSP 204.

FIG. 11 illustrates a block diagram showing how an end user 210 manually generates or updates a ticketing ticket in the ticketing system 103. In one embodiment, this is the result of the end user 210 noticing a problem, indicating a need, checking the status of a current ticketing ticket, or asking a question. In this way, the ticketing system 103 provides a convenient way for the end user 210 to communicate with the MSP 204 in a way that is managed and tracked.

Figure 11A:
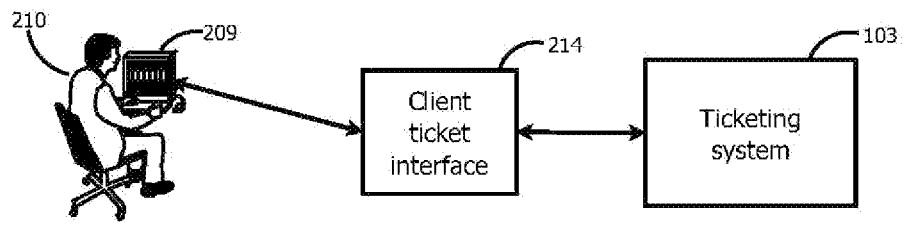
FIGS. 11A-B are illustrative block diagrams of embodiments of a manual client submission of a ticket.

In FIG. 11*a*, the end user 210 uses a device 209 to access the client ticket interface 214 of the ticketing system 103. The client ticket interface 214 is designed to provide friendly and easy-to-use access to clients. This allows the end user 210 to enter and update ticketing tickets simply.

Figure 11B:
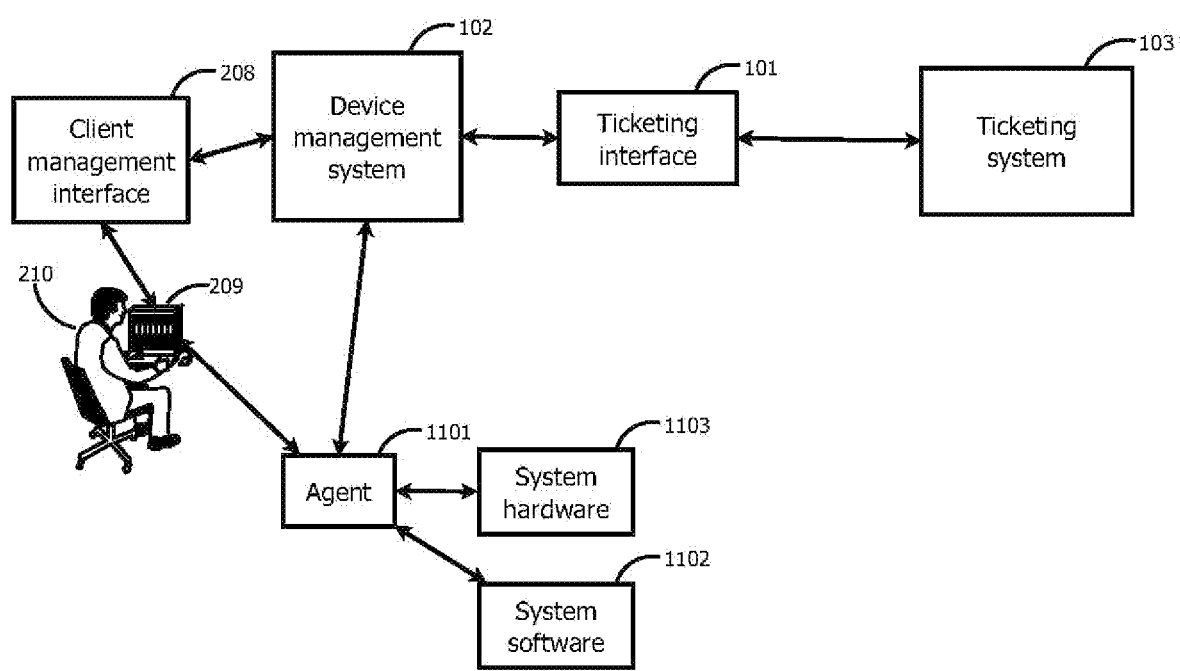

In FIG. 11*b*, the end user 210 is using a device 209 that is running the agent software 1101 of the device management system 102. The agent 1101 helps the end user 210 by starting the connection from the device 209 to a client management interface 208 on the device management system 102. The end user 210 uses this client management interface 208, in much the same way as the previously described client ticket interface 214 to the ticketing system 103, to create or update a device management ticket. In addition, the agent 1101 accesses the system software 1102 and system hardware 1103 on the device 209 and provides detailed status and operational information about the device 209 to the device management system 102. This additional information is associated with the device management ticket and can be extremely helpful to the MSP 204 in addressing the device management ticket. The ticketing interface 101 then uses the new device management information on the device management system 102 to create or update the appropriate ticketing ticket on the ticketing system 103. The ticketing ticket is then processed in the same way as if it were directly entered by the end user 210 as described in conjunction with FIG. 11*a*.

Figure 12:
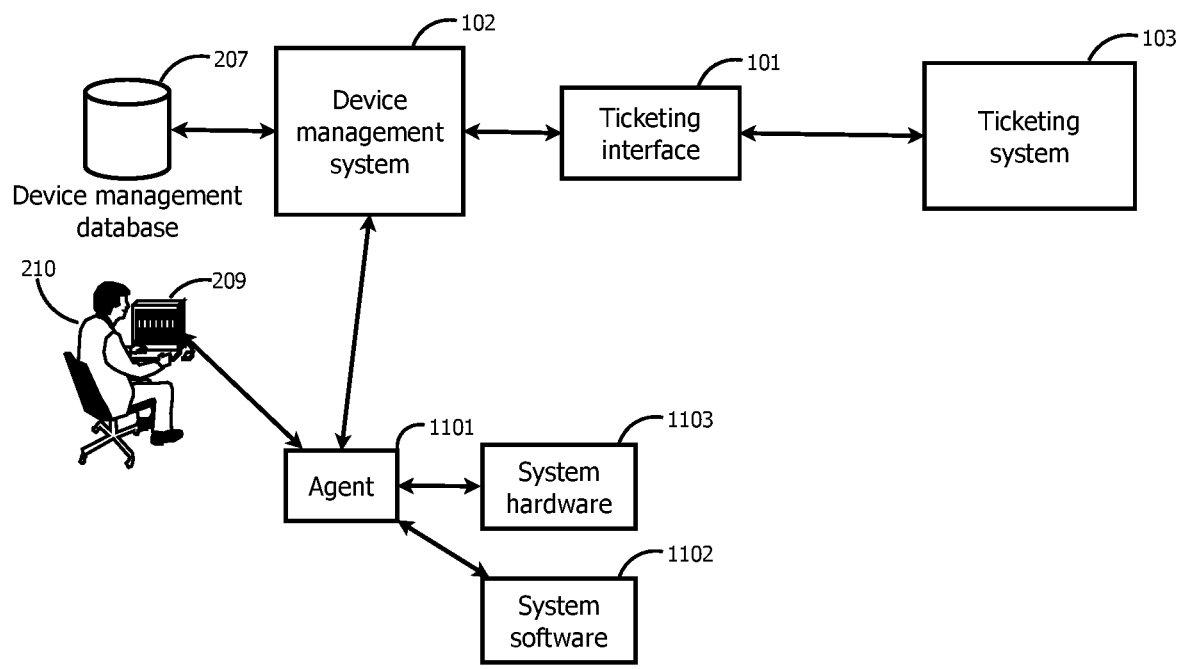
FIG. 12 is an illustrative block diagram of an embodiment of an automated ticket submission by a client device.

FIG. 12 illustrates a block diagram of the way in which device management tickets can be automatically generated without any effort by an end user 210. The device 209 is running an agent 1101 that uses the system software 1102 and system hardware 1103 to monitor the status of the device 209. The agent 1101 can also update the device 209 without any effort by an end user 210, in order to manage it effectively. The agent 1101 reports status information to the device management system 102 where it is stored in the device management database 207. If the device management system 102 determines that there is a condition on the device 209 that requires action by the MSP 204, it uses the ticketing interface 101 to generate or update a ticketing ticket on the ticketing system 103. This ticketing ticket is then received and managed in the same way as a ticketing ticket that is manually generated by an end user 210, as previously described in conjunction with FIG. 11.

There are many advantages to having the process illustrated by FIG. 12. The device management tickets generated this way are accurate and not subject to the interpretation and error of the end user 210. The device management tickets are complete, which is very valuable, since a end user 210 who is having a problem with the device 209 may be short of time and not willing to provide complete information. The device management tickets are timely since the process to generate them is quick and fully automated. The device management tickets are updated with additional information as the situation changes, since the agent 1101 continues to send status information to the device management system 102. The device management tickets are generated even for a device 209 that is not attended by an end user 210, as is common for a device 209 such as a server. All of these benefits conferred upon the device management tickets also apply to the ticketing tickets, because the ticketing interface 101 continues to update the ticketing system 103 with all of the device management information.

FIG. 13 illustrates a block diagram of ticket categories. FIG. 13*a* shows the device management ticket table 1301 in the device management database 207 of the device management system 102. The device management ticket table 1301 has a row 1305 for each ticket in the device management system. Each row 1305 has a column 1302 with an ID that uniquely identifies the device management ticket, a group of device management information columns 1303 with information about the device management ticket, and a ticket category column 1304 to store the ticket category 106. The ticket category 106 for a ticket is typically an integer whose numeric value is associated with a list of different categories.

FIG. 13*b* shows how the ticket category 106 is generated for a ticket. A mapping module 105 uses device management information 1307-1315 about the ticket to prioritize and determine what kind of ticket it is, and then selects a ticket category 106 for the device management ticket. The category system for tickets is very flexible and can be adapted to the needs of the MSP 204 because the parameters of the mapping module 105 are taken from the device management database 207. The device management database 207 is supplied with a default set of parameters that work well for most businesses, and the MSP 204 can easily adjust and tune the parameters in the device management database 207 to match the actual operational needs of the business. In addition, when circumstances change over time and the mapping module 105 needs to be updated with new or different parameters, the device management database 207 can be easily updated.

The mapping module 105 has a great deal of available information to drive the generation of the ticket category 106 for the device management ticket. FIG. 13*b* illustrates, in a way that is not meant to be limiting, a set of information 1307-1315 that is used by the mapping module 105 to determine the correct ticket category 106 for a device management ticket.

In one embodiment, a script is used to generate the ticket, and a command 1307 within the script itself sets the ticket category 106. In another embodiment, the ticket is generated by an automated process such as a monitor that triggers based on certain device characteristics and events, and the ID 1308 of that automated process is associated with a ticket category 106. In another embodiment, a specific category override 1309 is associated with a ticket during its creation to force a particular ticket category 106.

Tickets can be created directly on the ticketing system 103 manually by an end user 210, as discussed in conjunction with FIG. 11*a*. Tickets can also be created on the device management system 102 manually by an end user 210, as discussed in conjunction with FIG. 11*b*. Tickets can also be created on the device management system 102 automatically by an agent 1101, as discussed in conjunction with FIG. 12. Tickets can also be created manually by an MSP employee 205, either directly on the ticketing system 103 or on the device management system 102. These various sources for ticket creation define the ticket source 1310, which affects the ticket category 106 in one embodiment.

In one embodiment, the hardware platform 1311 to which the ticket refers affects the ticket category 106. In another embodiment, the device ID 1312 of the device to which the ticket refers affects the ticket category 106. In another embodiment, the client ID 1313 of the client 215 that owns the device to which the ticket refers affects the ticket category 106. In another embodiment, the location ID 1314 of the location 501 of the device to which the ticket refers affects the ticket category 106. In another embodiment, the group IDs 1315 of all the groups 701 containing the device to which the ticket refers affect the ticket category 106.

This device management information 1307-1315 is taken from the device management ticket table 1301 of the device management database 207, and serves as input to the mapping module 105 to generate the ticket category 106. After the mapping module 105 generates the ticket category 106, the ticket category column 1301 is updated in the device management ticket table 1301 of the device management database 207.

Figure 13C:
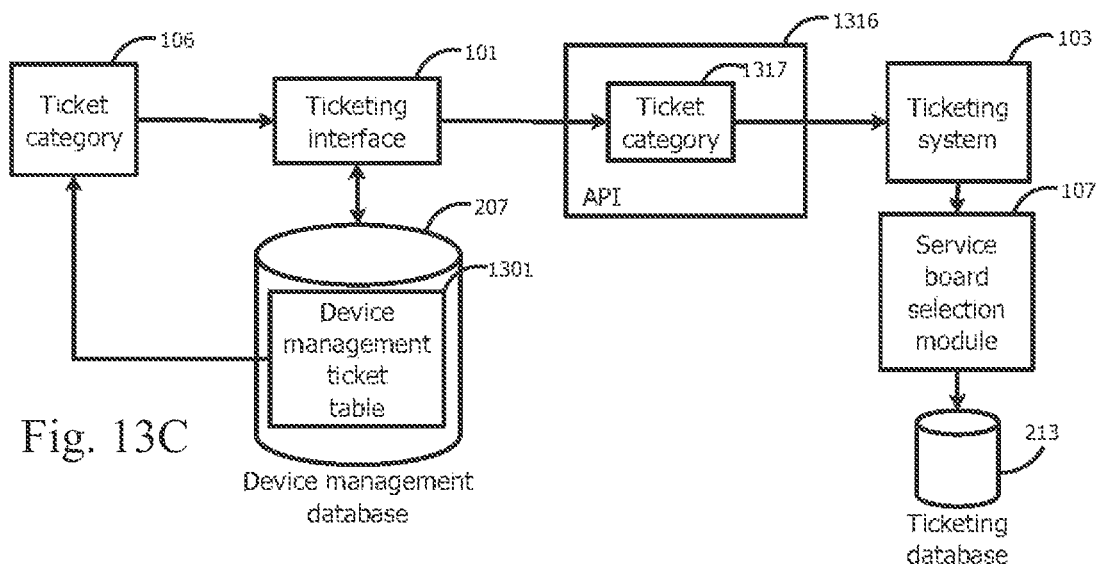

FIG. 13c shows how the ticket category 106 is used to update the ticketing system 103. The ticket category 106 is retrieved from the device management ticket table 1301 of the device management database 207 by the ticketing interface 101. The ticketing interface 101 uses an Application Programming Interface (API) 1316 to communicate with the ticketing system 103. This API 613 is described in more detail later in conjunction with FIG. 14. The API 1316 contains a ticket category data element 1317 for the ticket category which is passed along to the ticketing system 103. The ticketing interface uses the value of the ticket category 106 for the ticket category 1317 in the API. The ticketing system 103 uses the ticket category 1317 to select a service board with a service board selection module 107. This service board selection is updated in the ticketing database 213 of the ticketing system 103.

Referring to FIG. 10, the result of the service board selection module 107 that is stored in the ticketing database 213 is used by the interfaces 1006-1010 to prioritize and route the ticket. In one embodiment, a ticket for a server system can be given a higher priority than a ticket for a user device in the help desk interface 1006, because the ticket is likely to affect more end users. In one embodiment, a ticket for a client who is evaluating the management software and has not yet purchased it may be routed to both the help desk interface 1006, and to the sales manager 205i-205m who is responsible for the client, through the sales/marketing interface 1008. In one embodiment, a ticket indicating that a device needs a software update may be routed directly to the operations interface 1007 without going to the help desk interface 1006, because the solution to the issue is known and can be implemented immediately. There are many other embodiments illustrating the effectiveness of ticket categories in improving the response time and reducing the expense of handling tickets.

Figure 14:
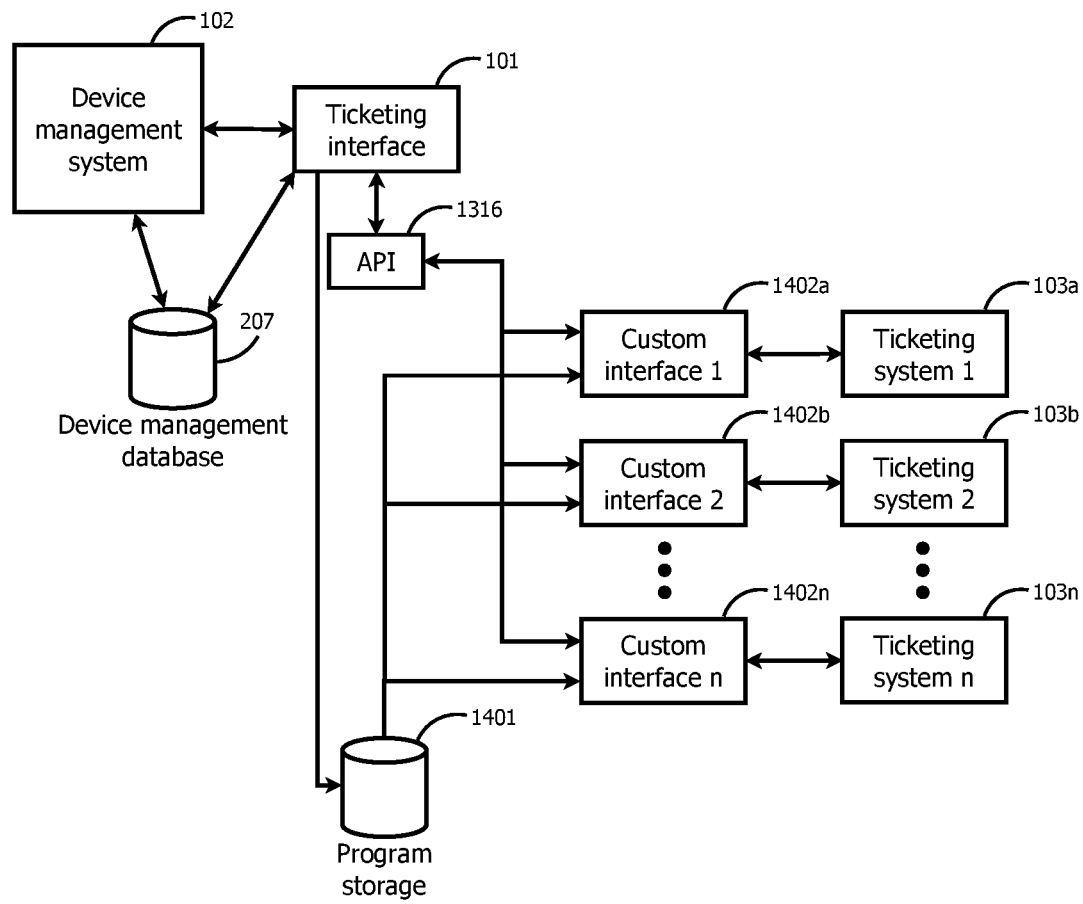
FIG. 14 is an illustrative block diagram of an embodiment of a plug-in architecture for a ticketing interface.

FIG. 14 is a block diagram illustrating how the ticketing interface 101 uses a plug-in architecture to give it the flexibility to interface with many different kinds of ticketing systems 103a-103n. The MSP 204 may be using any one of a number of different ticketing systems 103a-103n. The decision to change the ticketing system 103 requires changes in training and infrastructure that affect many systems within the MSP 204, as well as changes that are visible to end users of the clients of the MSP 204. Because of this, an MSP 204 is not likely to change to a different ticketing system 103 without a very strong and compelling reason, so the provider of the device management system 102 achieves a significant business advantage by providing a ticketing interface 101 that can interface to many different ticketing systems 103a-103n.

This flexibility is achieved with the plug-in architecture of FIG. 14. An explicit dividing line between the ticketing interface 101 and the ticketing system 103 is defined as an Application Programming Interface (API) 1316. Most of the functionality of the ticketing interface 101 is hidden behind the API 1316, and any functionality that varies between the different ticketing systems 103a-103n is exposed in the API 1316 where it is implemented by the individual custom interfaces 1402 for each of the ticketing systems 103. Careful definition of the API 1316 minimizes the amount of implementation that must be done in a custom interface 1402. The ticketing interface 101 can select the ticketing system 103 to which it interfaces by selecting the appropriate custom interface 1402 from the program storage 1401 of the device management system 102, loading that custom interface 1402, and accessing it to communicate to the ticketing system 103. The ticketing system 103 communicates with the custom interface 1402 when it needs to access or update information from the device management system 102, and the custom interface 1402 uses the API 1316 to communicate with the ticketing interface 101, which in turn uses the device management system 102 and its device management database 207 to satisfy the request.

The plug-in architecture of FIG. 14 is very flexible. It allows the device management system 102 to interface with multiple ticketing systems 103a-103n at the same time. It also allows the custom interfaces 1402 to be updated without changing or restarting the device management system 102. These updates can happen as a result of changes to the ticketing systems 103. Since the ticketing systems 103 are often provided by a different company than the device management system 102, it is important to be able to adapt to changes in them without disruption. The plug-in architecture also simplifies the addition of support for a new ticketing system 103, which has been previously described as a significant business advantage for the provider of the software for the device management system 102.

Figure 15:
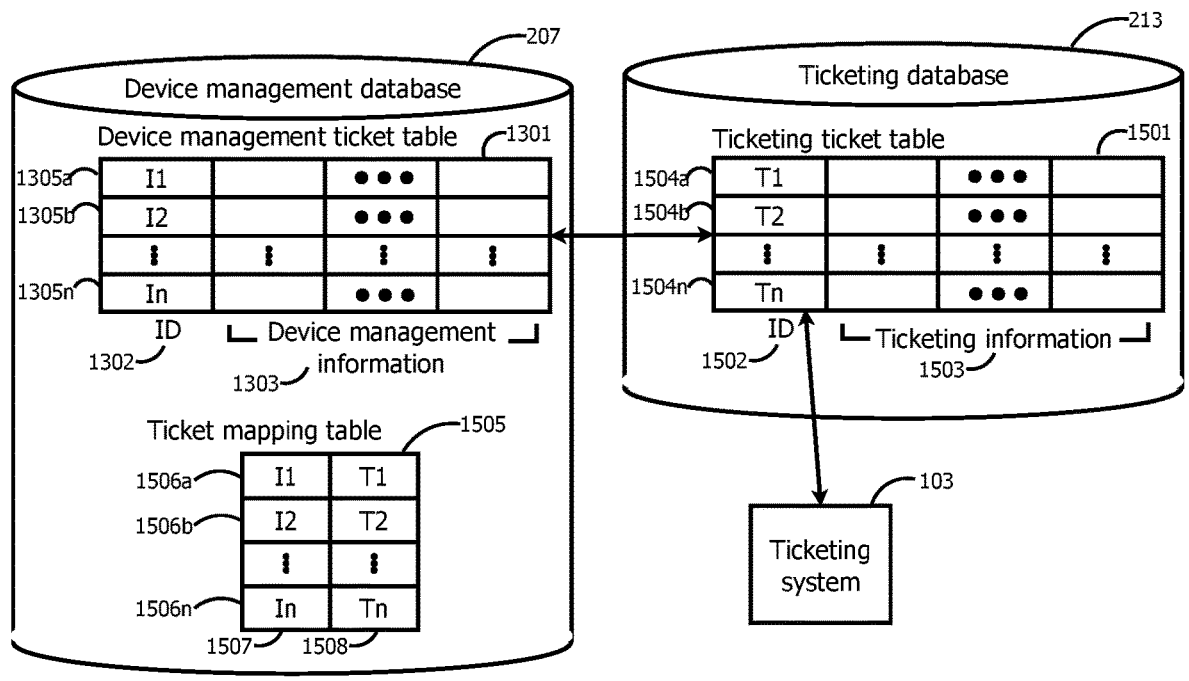
FIG. 15 is an illustrative block diagram of an embodiment of a source of synchronization issues between a management system and a ticketing system.

FIG. 15 is a block diagram illustrating one embodiment of a synchronization issue that arises between the device management system 102 and the ticketing system 103. This is one embodiment of an issue that the ticketing interface 101 must handle. As previously described, the device management ticket table 1301 of the device management database 207 on the device management system 102 contains an ID column 1302 that uniquely identifies each device management ticket 1305. Similarly, the ticketing system 103 has a ticketing ticket table 1501 in its ticketing database 213, which contains a row 1504 for each ticketing ticket in the system. The ticketing ticket table 1501 has an ID column 1502 that uniquely identifies each ticketing ticket, and has a group of ticketing information columns 1503 with additional information about the ticketing ticket.

The ticketing interface 101 must keep track of the association between the device management tickets 1305 in its device management ticket table 1301 and the ticketing tickets 1504 in the ticketing ticket table 1501. It uses a ticket mapping table 1505 in its device management database 207 in order to do this. The ticket mapping table 1505 has a row 1506 for each association between a device management ticket 1305 in the device management ticket table 1301 and a ticketing ticket 1504 in the ticketing ticket table 1501. The ticket mapping table 1505 has a column 1507 with the ID 1302 of the row 1305 from the device management ticket table 1301, and has a column 1508 with the ID 1502 of the corresponding row 1504 from the ticketing ticket table 1501. In this way, the ticket mapping table 1505 can be used to look up the ID 1502 of a ticketing ticket in the ticketing ticket table 1501, given the ID 1302 of a device management ticket in the device management ticket table 1301. It can also be used to look up the ID 1302 of a device management ticket in the device management ticket table 1301, given the ID 1502 of a ticketing ticket in the ticketing ticket table

1501. This provides the ticketing interface 101 a way to update ticket information in either direction between the two systems.

However, in one embodiment, the ticketing system 103 allows the ID 1502 to be changed. In one embodiment, the ID 1502 is visible to an end user and has an edit function. In another embodiment, the ticketing system 103 has a table optimization function that reorders the ticketing ticket table 1501 and changes one or more of the values of the ID 1502 as a result. Once this happens, the data in the ticket mapping table 1505 becomes invalid. As exemplified in FIG. 15, row 1506n of the ticket mapping table 1505 maps the value In from row 1305n of the device management ticket table 1301 to the value Tn from row 1504n of the ticketing ticket table 1501. In one embodiment, the ticketing system 103 updates row 1504n and changes the value of Tn. As a result, the value of Tn in the ID column 1502 of row 1504n no longer matches the value of Tn in column 1508 of row 1506n of the ticket mapping table 1505. This prevents the ticketing interface 101 from being able to update information about the ticket in rows 1305n and 1504n in either direction.

This is a significant problem, because it can be caused by an end user 210 but it impacts the business of the MSP 204. In one embodiment, an end user 210 updates the ID 1502 of an active ticketing ticket on Friday afternoon, and the MSP 204 loses all the revenue derived from addressing the ticket over the weekend, until a employee 205 at the MSP 204 notices the failure of the ticketing interface 101, and fixes the problem to restore the tracking of the ticket in both the device management system 102 and the ticketing system 103.

Figure 16:
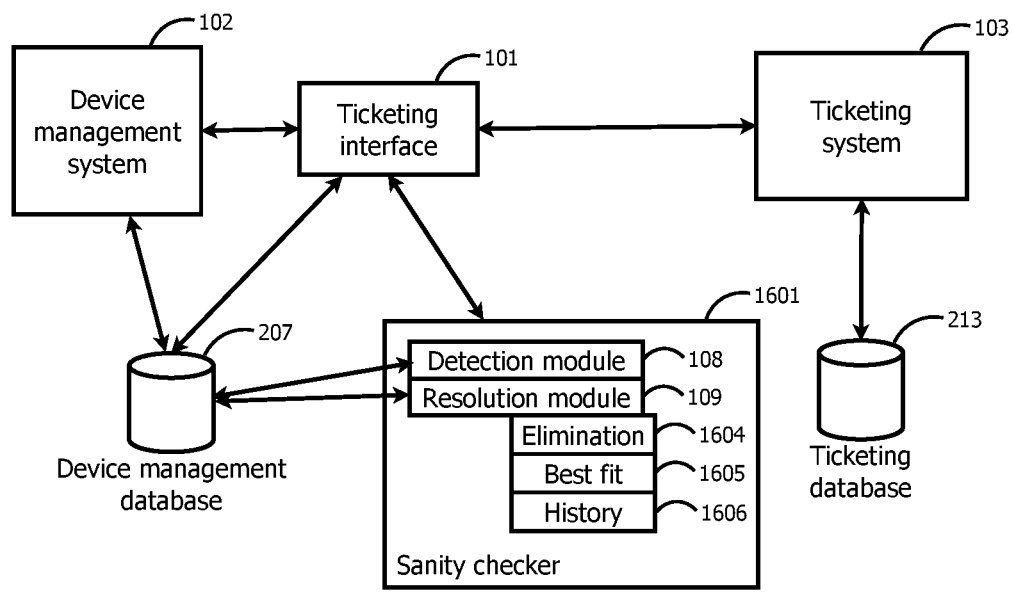
FIG. 16 is an illustrative block diagram of an embodiment of a sanity checker.

FIG. 16 is a block diagram illustrating how the synchronization problem described in conjunction with FIG. 15 is overcome. The ticketing interface 101 includes a sanity checker 1601 that is responsible for detecting and resolving synchronization issues. The sanity checker 1601 runs at a periodic interval and can also be invoked on demand if a problem is noticed. The sanity checker 1601 uses the ticketing interface 101 to communicate with the device management system 102 and the ticketing system 103. It can also access and update the device management database 207 directly. The sanity checker 1601 has a detection module 108 that detects when ticketing data does not correctly match in the device management database 207 and the ticketing database 213. When a mismatch is found, the sanity checker 1601 invokes the resolution module 109 with information about the mismatch. The resolution module 109 attempts to resolve the issue, and can be configured to create a ticket on the ticketing system 103 with information about its success or failure in the attempt.

The resolution module 109 has a number of different strategies for correcting the issue. In one embodiment, the resolution module 109 discovers the correlation between mismatched data by elimination 1604, where it removes matching data from consideration and matches what is left over. In another embodiment, the resolution module 109 uses matching between data columns of existing rows to find a best fit 1605, and synthesizes information for the unmatched columns. In another embodiment, the resolution module 109 accesses a history 1606 of changes to the database, determines what changes affected the matching, and corrects those changes. These are meant to be illustrative examples of the techniques and not to limit the scope of the resolution module 109.

The flexibility of the sanity checker 1601 is further enhanced by implementing the detection module 108 and resolution module 109 using parameters that are stored in the device management database 207. If a new synchronization issue arises that must be resolved manually, the detection and resolution of the issue can be added to the parameters in the device management database 207, and from then on the issue will be detected and resolved automatically by the sanity checker 1601. In this way, the sanity checker 1601 adds significant value and resilience to the ticketing interface 101.

Figure 17:
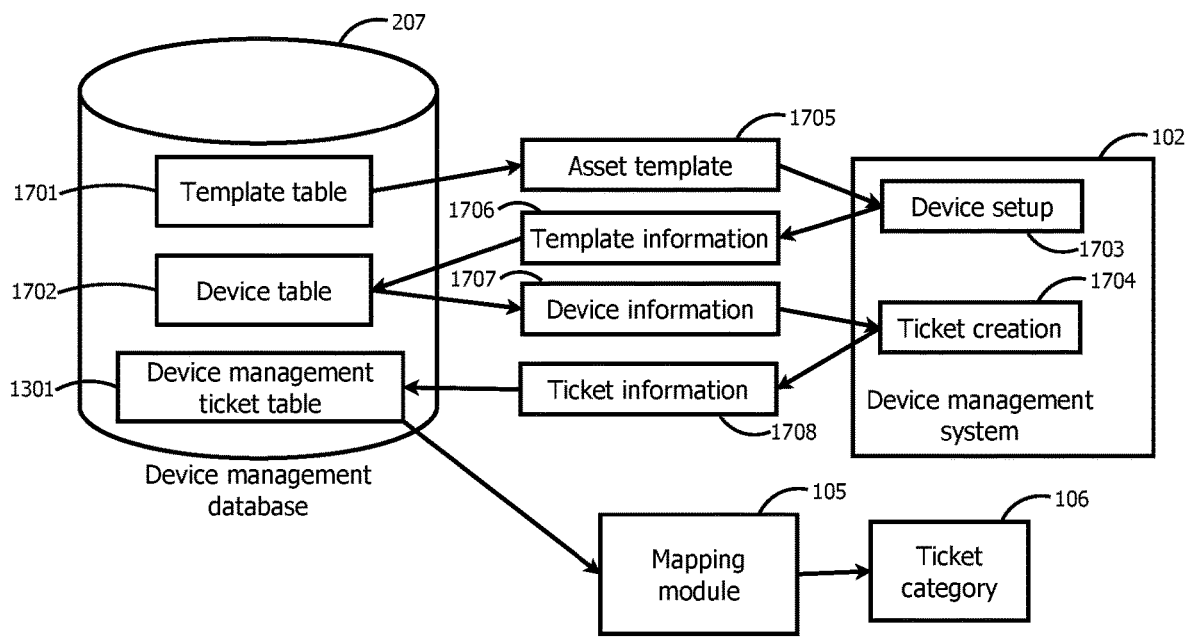
FIG. 17 is an illustrative block diagram of an embodiment of asset templates.

FIG. 17 is a block diagram illustrating the design and use of asset templates. An asset template 1705 is used to initialize tickets with information 1708 that can vary based on device management information. Each asset template 1705 is stored in a template table 1701 of the device management database 207 of the device management system 102. During the initial device setup 1703, the device management system 102 selects an asset template 1705 from the template table 1701 based on the device being setup and the client information about the device, and uses the template information 1706 to initialize some of the information in the device table 1702 of the device management database 207. Later, during the ticket creation process 1704 on the device management system 102, device information 1707 from the device table 1702 is used to add ticket information 1708 to the device management ticket table 1301. This ticket information 1708 serves as input to the mapping module 105 that generates the ticket category 106 as previously described in conjunction with FIG. 13. In this way, the information in the asset template 1705 controls the ticket category 106, which in turn controls the routing and prioritization of the ticket in the ticketing system 103.

Asset templates have many important business uses. In one embodiment, the MSP 204 provides multiple service levels by which clients 215 pay more money for a faster response time. This can be implemented by using an asset template 1705 for each service level. These templates are associated with the clients when they purchase the corresponding service level. When a device generates a ticket, the asset template 1705 associated with the client owning that device is used, and the resulting ticket contains ticket information 1708 allowing the mapping module 105 to select the appropriate ticket category 106 for the ticket. That category gives the ticket the appropriate priority in the help desk interface 1006 based on the client's service level. At the same time, the ticket category 106 also gives the ticket the appropriate billing rate in the accounting interface 1009 (higher cost for higher priority). In another embodiment, the MSP 204 decides that servers at all clients should be treated with higher priority, and billed at a higher rate, than end user devices. The device management system 102 automatically determines that the device is a server during the initial device setup 1703, and selects a different asset template 1705 based on that information. In this way, the same result (higher priority at higher cost) is achieved, but for a different reason.

Figure 18A:
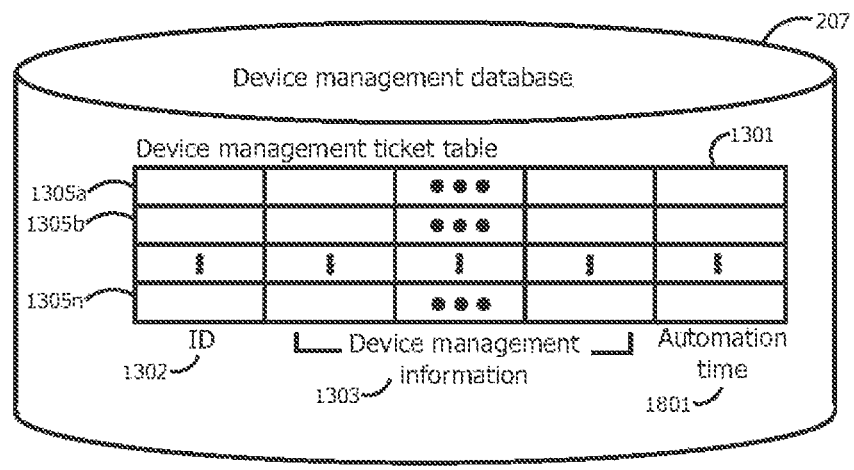
FIGS. 18A-B are illustrative block diagrams of embodiments of automation time records.

FIG. 18 is a block diagram illustrating the design and use of time records. FIG. 18a shows the device management ticket table 1301 previously described in conjunction with FIG. 13. The device management ticket table 1301 has a row 1305 for each device management ticket. Each row 1305 has an ID column 1302 that uniquely identifies the device management ticket, and a group of device management information columns 1303 containing information about the device management ticket. In addition, the device management ticket table 1301 has an automation time column 1801. This column contains information about the amount of human time that was saved by the device management system 102 in automating the detection and resolution involved with the device management ticket.

Figure 18B:
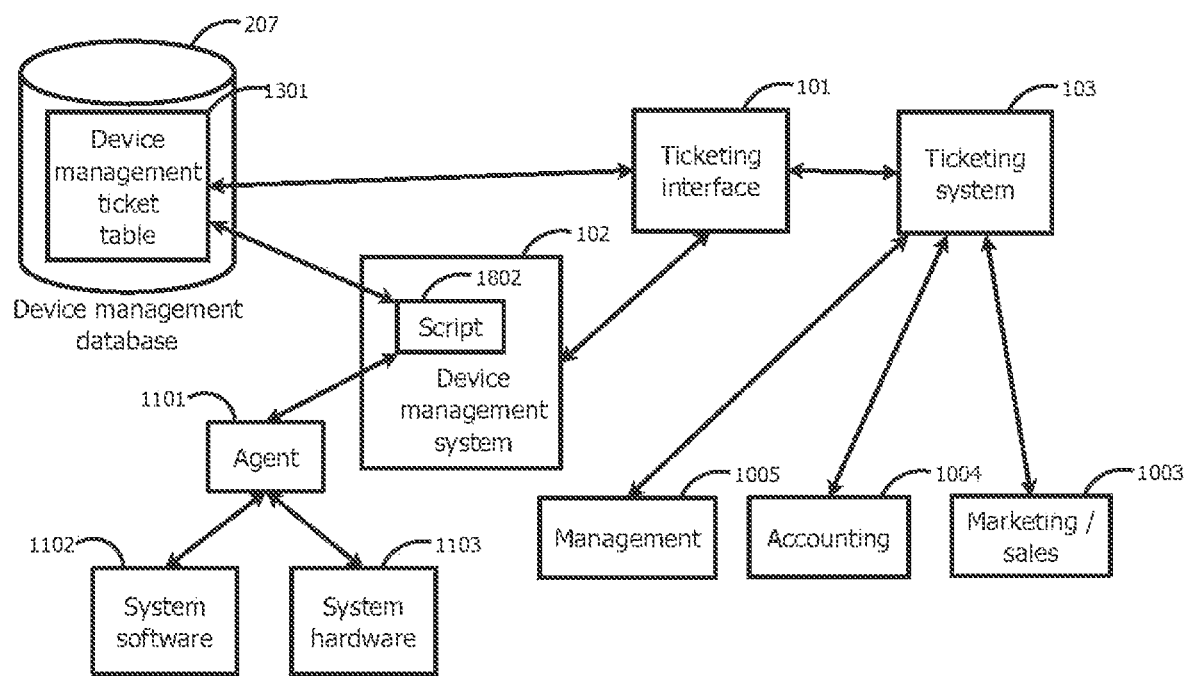

FIG. 18*b* shows the process for generating, maintaining, and using the automation time information 1801. The device management system 102 runs a script 1802 that communicates with the agent 1101, which in turn uses the system software 1102 and system hardware 1103 to implement the actions of the script 1802. The result is that the script 1802 automates the detection and resolution of an issue that would normally require human intervention. The script 1802 has a mechanism for estimating the amount of human time that would have been required for detecting and resolving the issue, and it updates the automation time column 1801 of the device management ticket table 1301 in the device management database 207 with this information. The ticketing interface 101 then updates the ticketing system 103 with this information.

The information about automation time is extremely useful to the MSP 204 in many ways. In one embodiment, marketing/sales 1003 uses the information about automation time as hard data for potential clients about how the device management system 102 and ticketing system 103 can save them money, and also as evidence for existing clients on how it is already saving them money. In another embodiment, accounting 1004 uses the information about automation time to accurately bill clients for services at a lower rate for automation. In another embodiment, management 1005 keeps track of how efficiently the company is using its automated tools and can understand the return on investment that they provide, as well as getting key information about how that return can be improved.

Figure 19:
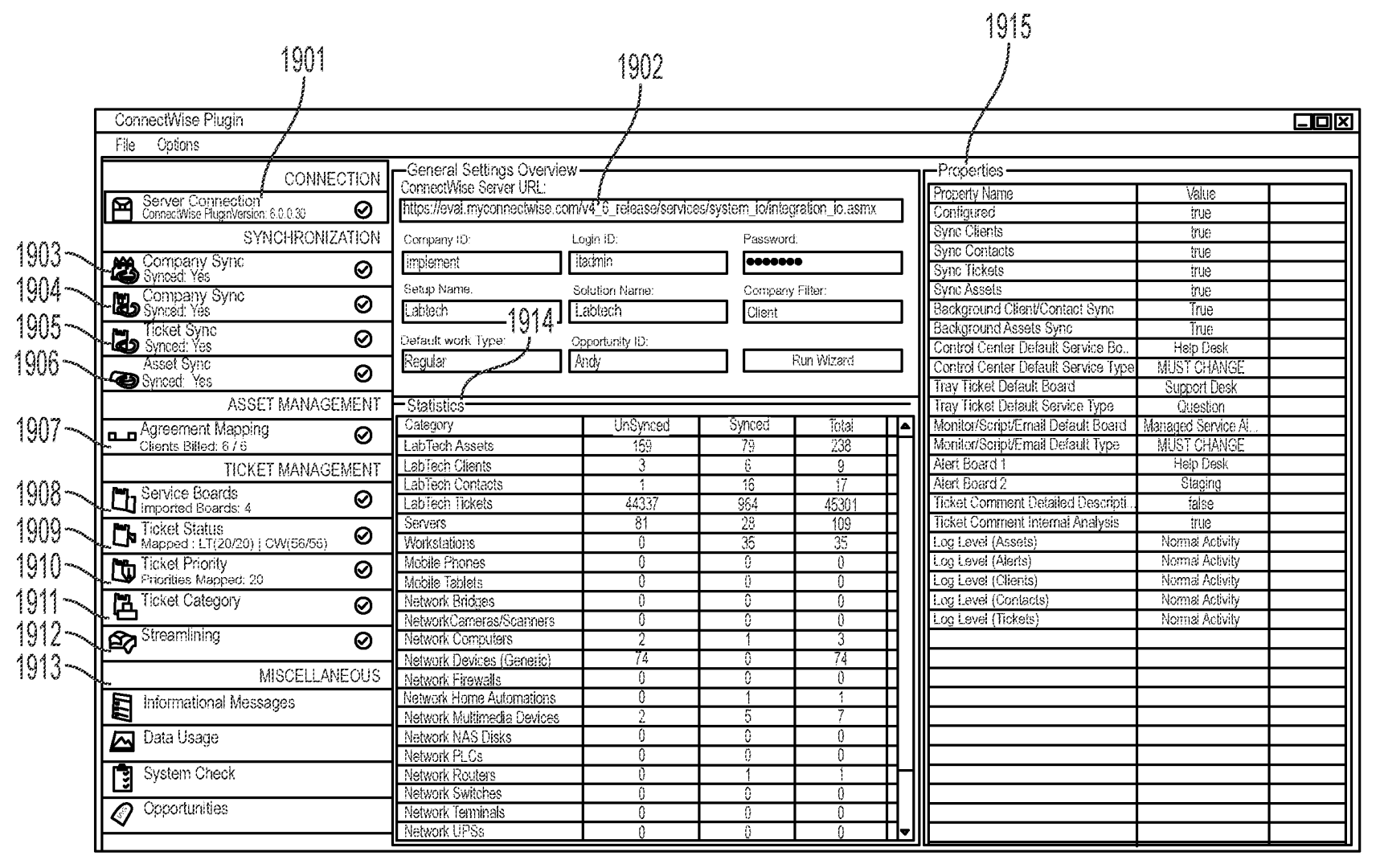

FIG. 19 illustrates an embodiment of a user interface, provided by the ticketing interface 101, that shows an overview of the overall system described in conjunction with FIG. 2. The Server Connection display selected by 1901 shows information about the connection between the device management system 102 and the ticketing system 103. The Company Sync display selected by 1903 shows information about the synchronization between the device management database 207 and the ticketing database 213 of data about the companies of the clients 215. The Contact Sync display selected by 1904 shows information about the synchronization between the device management database 207 and the ticketing database 213 of data about the contact information for the clients 215. The Ticket Sync display selected by 1905 shows information about the synchronization between the device management database 207 and the ticketing database 213 of ticketing data. The Asset Sync display selected by 1906 shows information about the synchronization between the device management database 207 and the ticketing database 213 of data about the devices under management 209. The Agreement Mapping display selected by 1907 shows information about contractual agreements between the MSP 204 and the clients 215. The Service Boards display selected by 1908 shows information about the way in which tickets on the device management system 102 are mapped to service boards on the ticketing system 103. The Ticket Status display selected by 1909 shows detailed information about the tickets on both the device management system 102 and the ticketing system 103. The Ticket Priority display selected by 1910 shows information about the way in which tickets on the device management system 102 are prioritized on the ticketing system 103. The Ticket Category display selected by 1911 shows information about the way in which tickets on the device management system 102 are mapped to ticket categories 106. The Streamlining display selected by 1912 shows information about the way in which tickets on the device management system 102 are mapped to ticket categories 106 in a special way based solely on one piece of the mapping information 1307-1315. Displays selected by entries in the Miscellaneous area 1913 show a variety of information about the overall system, including messages, charts of data usage, sanity checks, and sales opportunities.

The Server Connection display selected by 1901 includes the network address 1902 of the ticketing system 103, and allows editing that address to use a different ticketing system server. It includes a Statistics display 1914 showing a summary of actions taken by the ticketing interface 101. It also includes a Properties display 1915 that allows editing of parameters that control the ticketing interface 101.

Figure 20:
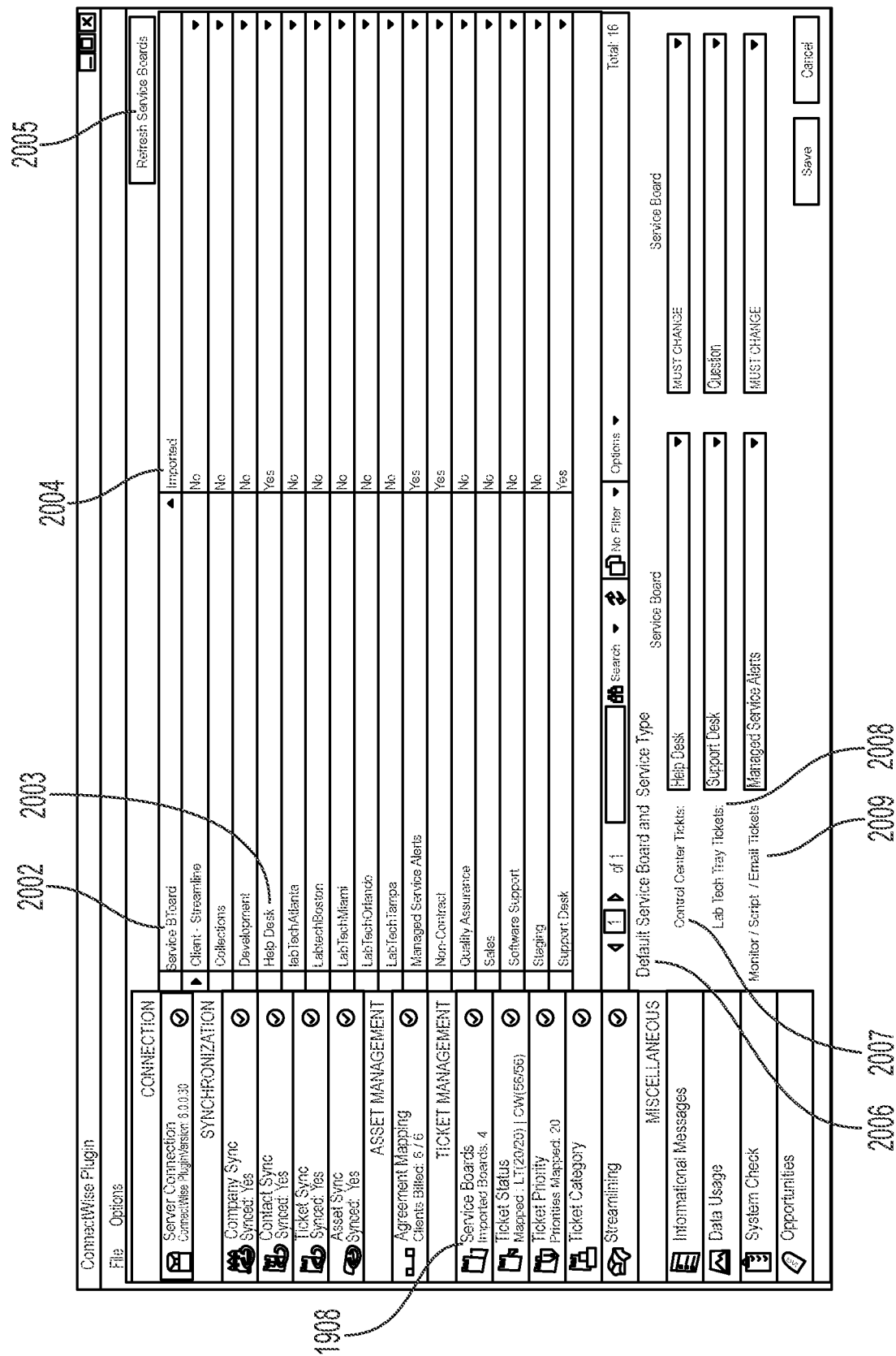
FIG. 20 is an illustrative example of an embodiment of a user interface for display and modification of service boards.

FIG. 20 illustrates an embodiment of a user interface, provided by the ticketing interface 101, that shows the Service Boards display selected by 1908. The service board associated with a ticket is used to route the ticket to the correct employees 205 through the appropriate interface 1006-1010, as previously described in conjunction with FIG. 10. The display contains a list 2002 of the service boards and an indication 2004 of whether they were imported from the ticketing system 103 or created on the device management system 102. It has a button 2005 that initiates importing any new service boards from the ticketing system 103. It has an interface 2006 that allows the configuration of the default service board for tickets for which the service board is not otherwise specified. This can be configured separately for tickets 2007 that are created manually through the client management interface 208 as shown in FIG. 11*b*, tickets 2008 that are created manually through the agent 1101 as shown in FIG. 11*b*, and tickets 2009 that are created automatically by the agent 1101 as shown in FIG. 12.

Figure 21:
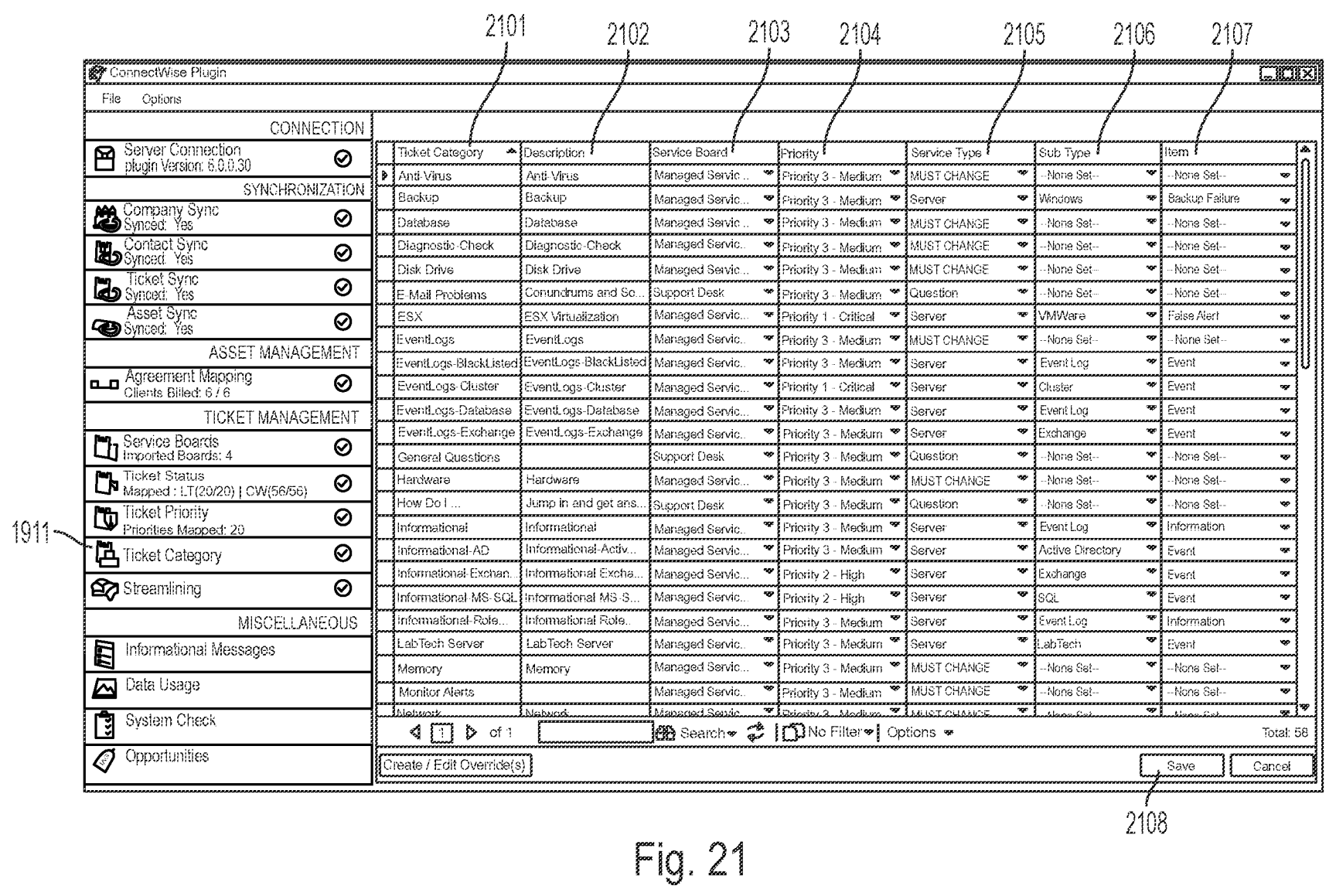

FIG. 21 illustrates an embodiment of a user interface, provided by the ticketing interface 101, that shows the Ticket Category display selected by 1911. The category associated with a ticket is used by the service board selection module 107 to select the correct service board, as previously described in conjunction with FIG. 13. The display contains a list of ticket categories with the name 2101, description 2102, service board selection 2103, priority 2104, service type 2105, sub type 2106, and item 2107 associated with each ticket category. The name 2101 is used to display the ticket category. The description 2102 is used to provide a summary of the function of the ticket category. The service board selection 2103 for a ticket is used to route the ticket to the correct employees 205 through the appropriate interface 1006-1010, as previously described in conjunction with FIG. 10. The priority 2104, service type 2105, sub type 2106, and item 2107 associated with a ticket are used to provide more fine-grained control over the display of tickets to employees 205 in the appropriate interface 1006-1010.

Any of the fields 2101-2107 can be edited for any category by selecting the field and changing it. When the editing operations are done, clicking on the Save button 2108 saves the changes.

FIG. 22 illustrates an embodiment of a user interface, provided by the ticketing interface 101, that shows the Ticket Priority display selected by 1910. The priority associated with a ticket is used to provide more control over the display of tickets to employees 205 in the appropriate interface 1006-1010, as previously described in conjunction with FIG. 10. The display contains a list of ticket priorities with the name 2201 of the priority on the device management system 102, and the name 2202 of the priority on the ticketing system 103.

Any of the fields 2201-2202 can be edited for any priority by selecting the field and changing it. When the editing operations are done, clicking on the Save button 2203 saves the changes.

Figure 23:
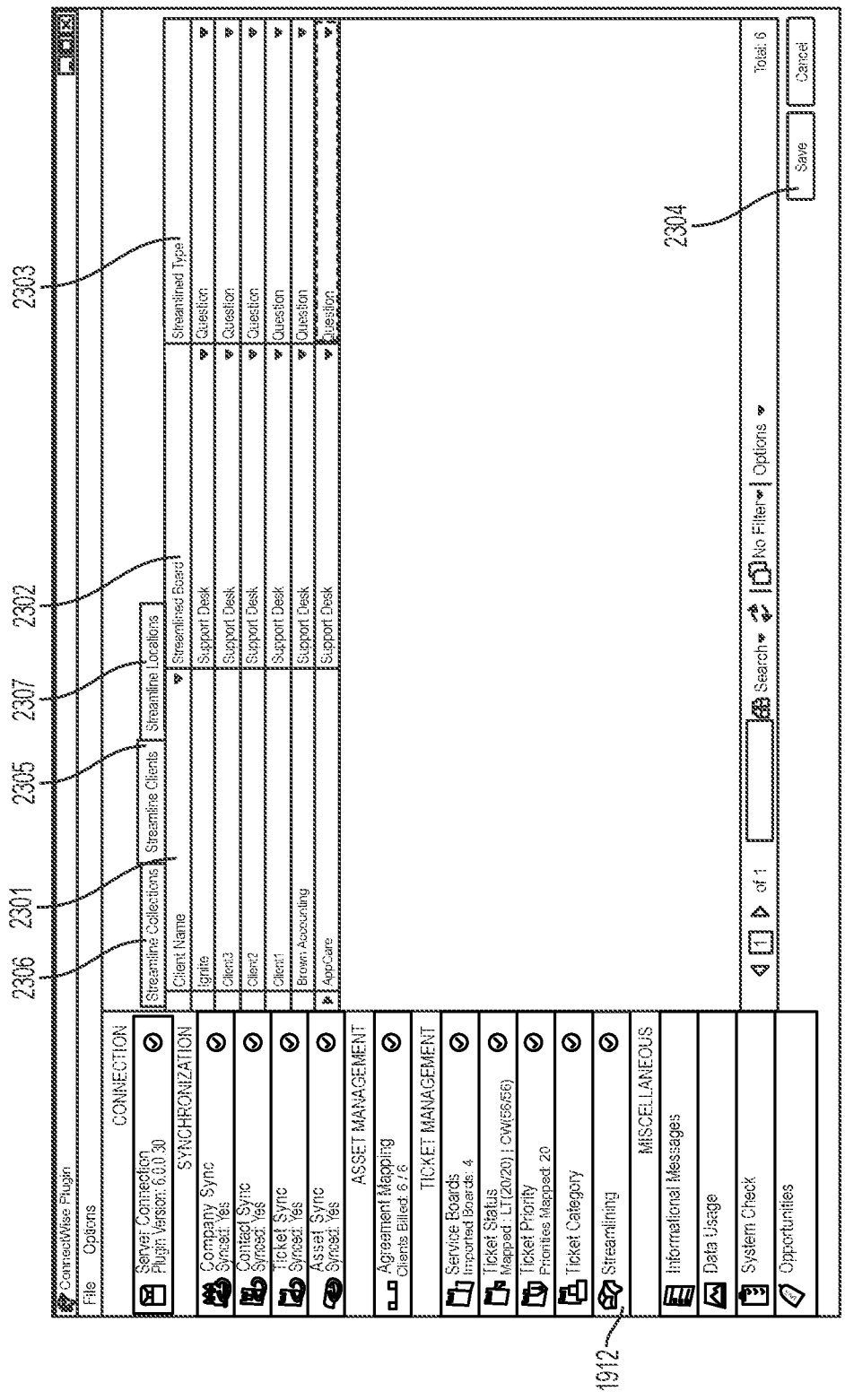
FIG. 23 is an illustrative example of an embodiment of a user interface for display and modification of ticket streamlining.

FIG. 23 illustrates an embodiment of a user interface, provided by the ticketing interface 101, that shows the Streamlining display selected by 1912. Streamlining provides a simplified way to control the service board selection module 107 based on a very simple selection rule that uses a small amount of information 1307-1315 about the ticket. The service board associated with a ticketing ticket is used to provide control over the display of ticketing tickets to employees 205 in the appropriate interface 1006-1010, as previously described in conjunction with FIG. 10. The Streamline Clients part of the display 2305 contains a list of clients, which usually represent different clients 215, with the name 2301, the service board 2302 to which tickets from that client are sent, and the ticket type 2303 that is assigned to tickets from that client. A similar configuration 2306 is available for assigning service boards based on collections, which are lists of groups 701 as previously described in conjunction with FIG. 7. A similar configuration 2307 is available for assigning service boards based on locations 501.

Any of the fields 2301-2303 in any of the configuration screens 2305-2307 can be edited by selecting the field and changing it. When the editing operations are done, clicking on the Save button 2304 saves the changes.

Figure 24:
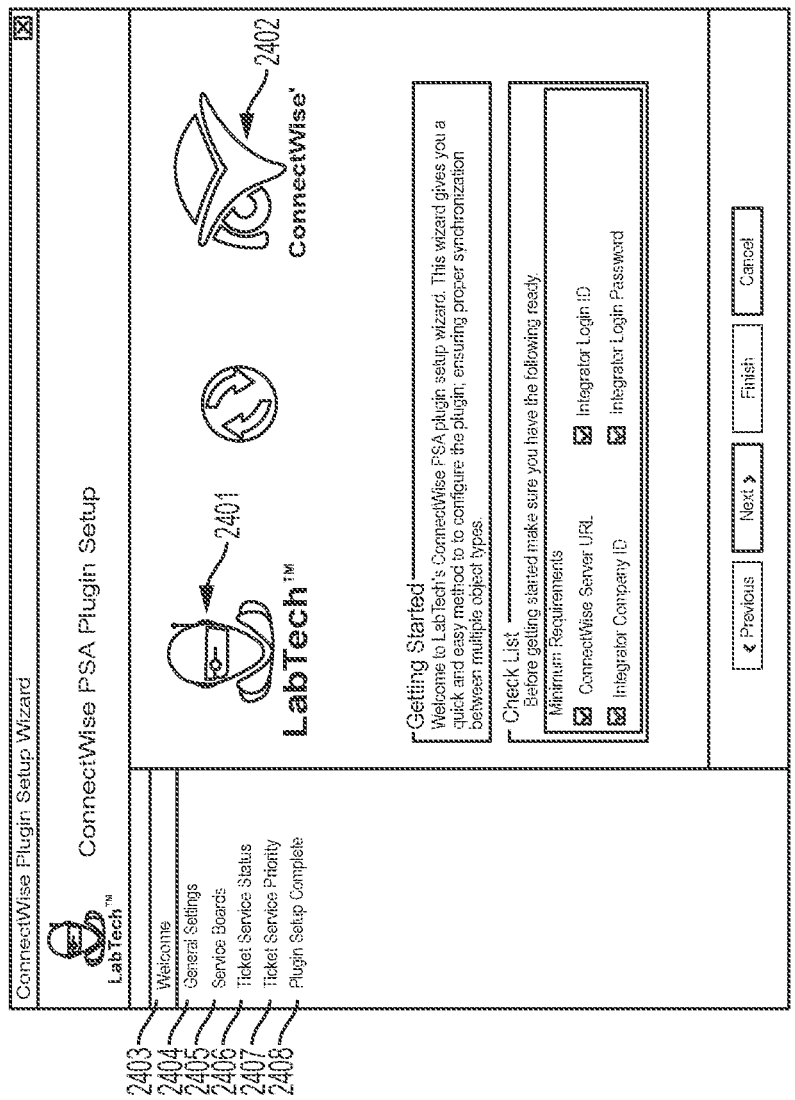
FIG. 24 is an illustrative example of an embodiment of a user interface for display and modification of plug-ins.

FIG. 24 illustrates an embodiment of a user interface, provided by a plug-in custom interface 1402, to install and configure the custom interface. The user interface uses a graphical element 2401 to identify the type of device management system 102 and a graphical element 2402 to identify the type of ticketing system 103 that it is designed to interface. The installation and configuration is managed using a step-by-step wizard that introduces the product 2403, configures general settings 2404, configures service boards 2405, configures ticket service status 2406, configures ticket service priority 2407, and completes the installation and setup 2408.

Figure 25A:
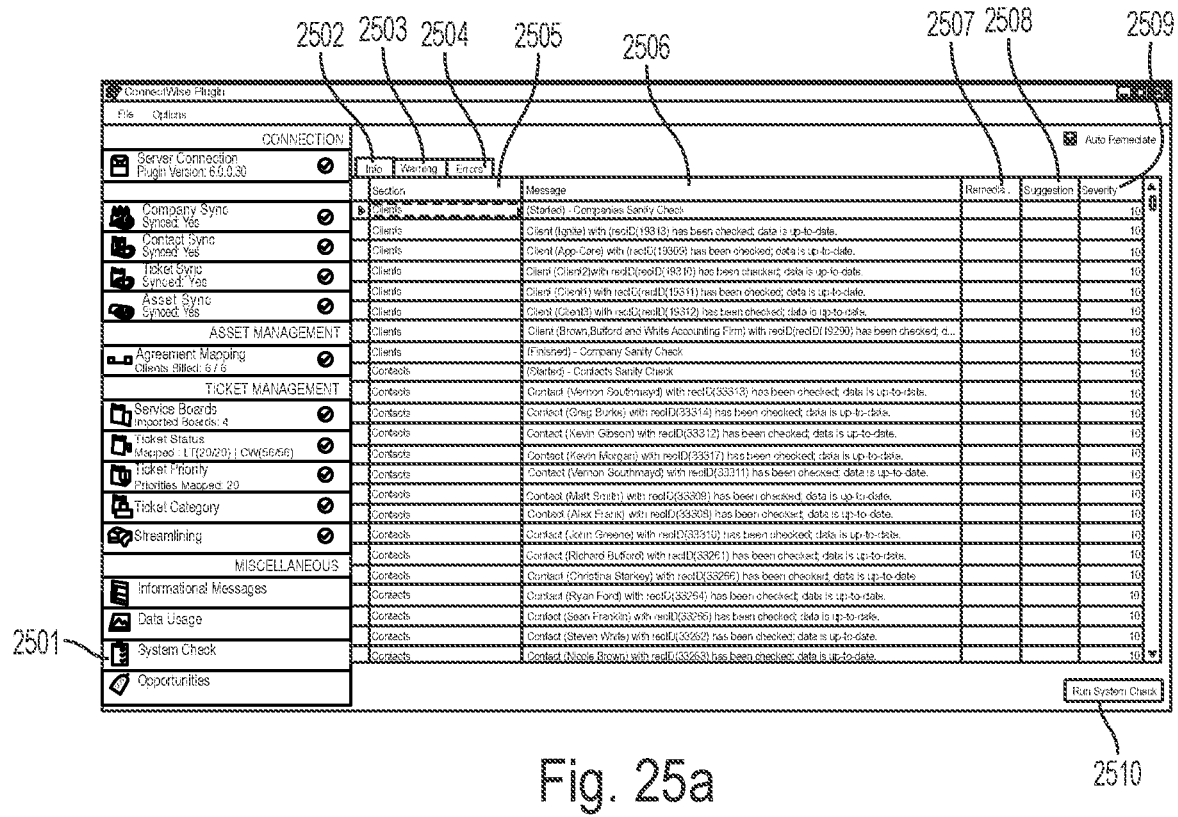
FIGS. 25A-B are illustrative examples of embodiments of a user interface for display and modification of a sanity checker.

FIG. 25 illustrates an embodiment of a user interface, provided by the ticketing interface 101, that provides control and shows information about the sanity checker 1601 described in conjunction with FIG. 16. FIG. 25a show the main sanity check display that is selected by the System Check item 2501. It displays a line for each message from a sanity check that was run, showing the section 2505, the message 2506, the remediation 2507, the suggestion 2508, and the severity 2509 associated with the sanity check. The messages are organized into informational 2502, warning 2503, and error 2504 messages. The section 2505 provides a convenient way to organize and sort the messages. The message text 2506 is a readable form of the message. The remediation 2507 describes any action that was taken by the system in conjunction with the message. The suggestion 2508 provides advice to an end user on actions that might be taken as a result of the message. The severity 2509 gives a numerical classification on how serious the error is. As described in conjunction with FIG. 16, the sanity checks are run periodically, but they can be initiated manually by clicking on the Run System Check button 2510.

Figure 25B:
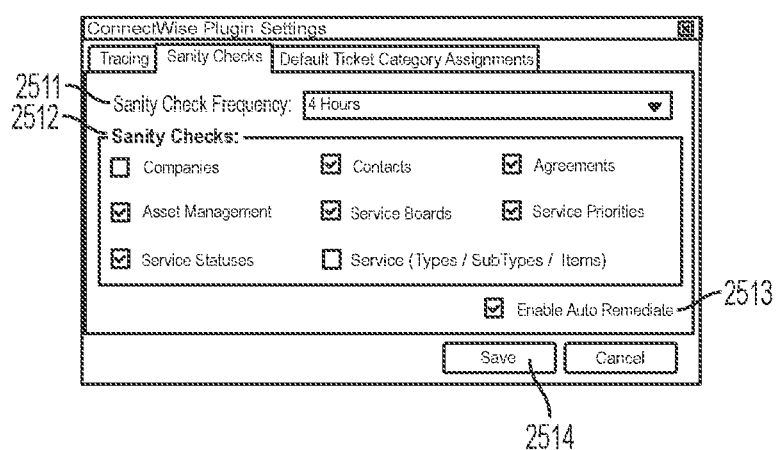

FIG. 25b shows an embodiment of a user interface to configure the sanity checks. The Sanity Check Frequency control 2511 adjusts how often the sanity checks are run. The Sanity Checks area 2512 selects which sanity checks are run. The Enable Auto Remediate control 2513 turns on and off the feature for the system to take action to fix errors that are discovered by the sanity checks. When the end user is finished with configuration, clicking on the Save button 2514 applies the configuration changes.

Figure 26:
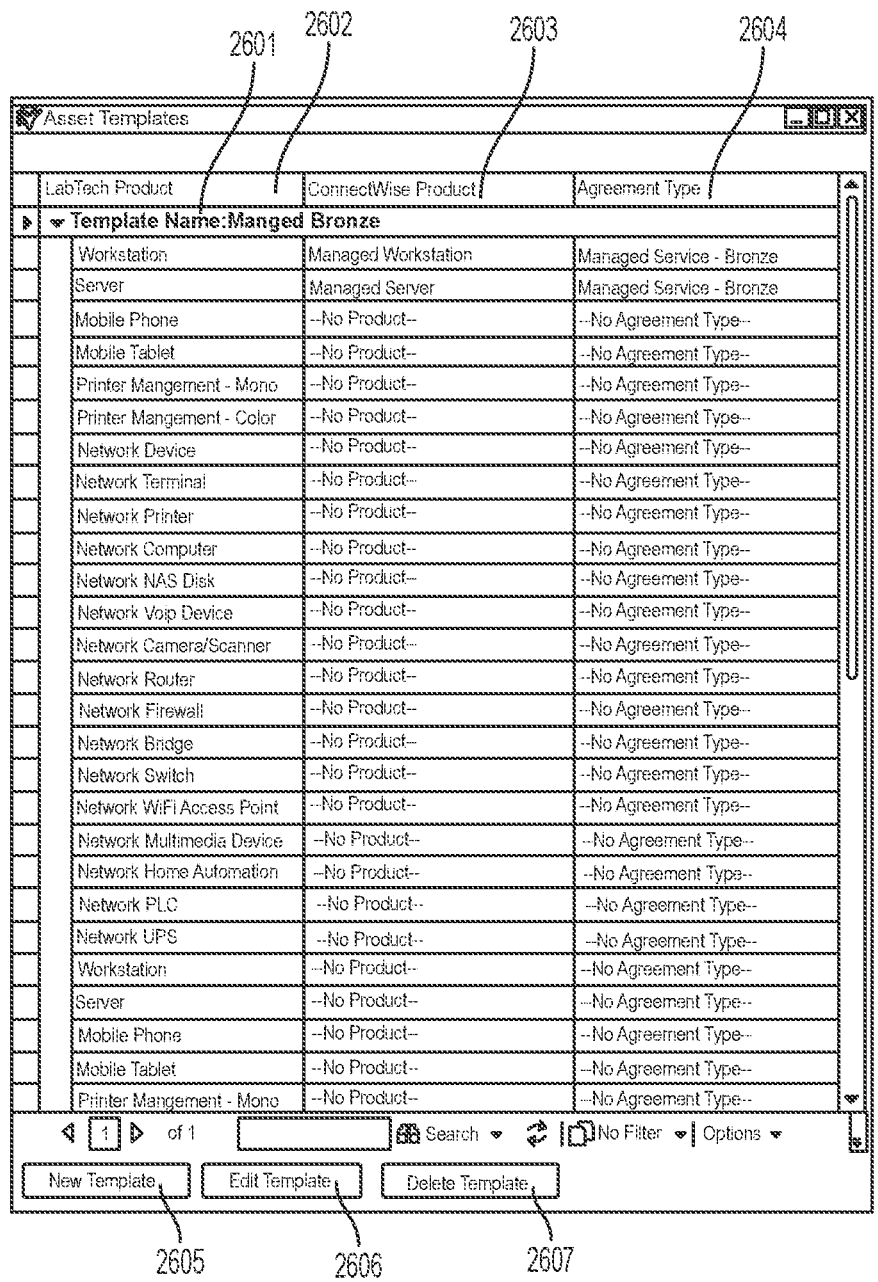
FIG. 26 is an illustrative example of an embodiment of a user interface for display and modification of asset templates.

FIG. 26 illustrates an embodiment of a user interface, provided by the ticketing interface 101, that provides control and shows information about asset templates 1705 as described in conjunction with FIG. 17. The header 2601 shows the name of the individual asset template 1705 that is displayed. Each line shows the mapping from a product 2602 in the device management system 102 to a product 2603 in the ticketing system 103, and the agreement type 2604 that is associated with that product. New asset templates can be created by using the New Template button 2605. Existing asset templates can be modified by using the Edit Template button 2606. Existing asset templates can be removed by using the Delete Template button 2607.

Figure 27:
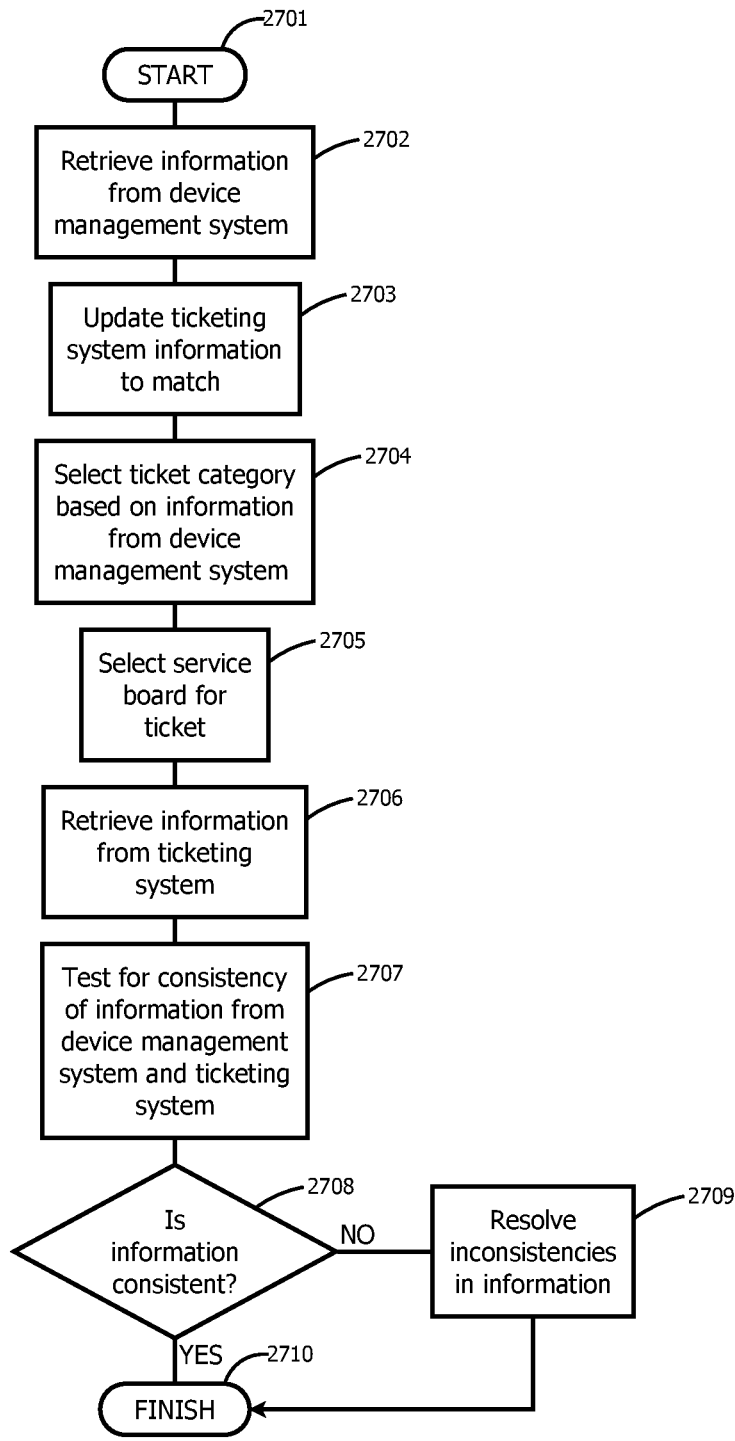
FIG. 27 is an illustrative flowchart depicting one embodiment of the steps taken to synchronize a device management system with a ticketing system

FIG. 27 illustrates a flowchart of an embodiment of the steps taken to synchronize a device management system with a ticketing system. The process begins with step 2701. Step 2702 retrieves the device management information from the device management system. Step 2703 updates the ticketing information on the ticketing system to match. Step 2704 selects a ticket category based on the device management information, and step 2705 selects a service board for the ticket. Step 2706 retrieves the ticketing information from the ticketing system, and then step 2707 tests for the consistency of the device management information retrieved in step 2702 and the ticketing information retrieved in step 2706. If the information is consistent, then step 2708 proceeds to step 2710 to finish the process. If not, step 2708 proceeds to step 2709, which resolves any inconsistencies in the information, and then proceeds to step 2710 to finish the process.

There are many practical and operational refinements to the systems and methods of the present disclosure that arise in actual use. These refinements can give rise to additional embodiments that are apparent to one skilled in the art, but have not been described in the detailed embodiments above. Some of these refinements are listed here as examples. This is not a comprehensive list but is intended to demonstrate additional aspects of the power and flexibility of the invention:

In one example, the management server can use information from the agent about devices under management to automatically assign roles to devices in the ticketing system server. In another example, the management server can use information from the agent about the timing and nature of actions taken on devices under management, both automated and manual, along with the roles assigned to the devices, to adjust pricing on those actions in the ticketing system server.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system to synchronize tickets between different ticket systems, comprising:
   a server communicatively coupled to a first ticket system and a second ticket system different from the first ticket system, the server executing computer-readable instructions causing the server to:
   receive, via a ticketing interface from the first ticket system, first ticket information associated with a ticket of the first ticket system;
   receive, via the ticketing interface from the second ticket system, second ticket information associated with a ticket of the second ticket system;
   compare the first ticket information with the second ticket information;
   update, responsive to the comparison of the first ticket information with the second ticket information, the first ticket information of the first ticket system to match the second ticket information of the second ticket system;
   identify, based on the second ticket information, a ticket category of the ticket of the second ticket system;
   select, responsive to the identified ticket category, a service board for the ticket of the first ticket system;
   transmit to the second ticket system, instructions to update the second ticket information to match the first ticket information; and
   determine that a modification of an identifier of the ticket of the first ticket system is inconsistent with an identifier of the ticket of the second ticket system.

2. The system of claim 1, wherein the servers executes computer-readable instructions causing the server to:
   identify, in the second ticket information, time record information corresponding to an amount of time for resolving the ticket of the second ticket system.

3. The system of claim 2, wherein the servers executes computer-readable instructions causing the server to:
   update the ticket of the first ticket system with the time record information.

4. The system of claim 1, wherein the servers executes computer-readable instructions causing the server to:
   select a template based on a device referenced by the ticket of the second ticket system; and
   initialize the second ticket information based on the template.

5. The system of claim 1, wherein the server executes computer-readable instructions causing the server to:
   repair, responsive to the determination that a modification of an identifier of the ticket of the first ticket system is inconsistent with an identifier of the ticket of the second ticket system, one of the second ticket information and the first ticket information.

6. The system of claim 1, wherein the servers executes computer-readable instructions causing the server to:
modify, responsive to the determination that a modification of an identifier of the ticket of the first ticket system is inconsistent with an identifier of the ticket of the second ticket system, the ticket of the first ticket system to correspond to the ticket of the second ticket system.

7. The system of claim 1, wherein the servers executes computer-readable instructions causing the server to:
modify, responsive to the determination that a modification of an identifier of the ticket of the first ticket system is inconsistent with an identifier of the ticket of the second ticket system, the ticket of the second ticket system to correspond to the ticket of the first ticket system.

8. The system of claim 1, wherein the second ticket system comprises a device management system.

9. A method of synchronizing tickets between different ticket systems, comprising:
receiving, by one or more processors communicatively coupled to a first ticket system and a second ticket system different from the first ticket system, first ticket information associated with a ticket of the first ticket system;
comparing, by the one or more processors, the first ticket information with the second ticket information;
updating, by the one or more processors responsive to the comparison of the first ticket information with the second ticket information, the first ticket information of the first ticket system to match the second ticket information of the second ticket system;
identifying, by the one or more processors based on the second ticket information, a ticket category of the ticket of the second ticket system;
selecting, by the one or more processors responsive to the identified ticket category, a service board for the ticket of the first ticket system; and
transmitting, by the one or more processors, to the second ticket system, instructions to update the second ticket information to match the first ticket information; and
determining that a modification of an identifier of the ticket of the first ticket system is inconsistent with an identifier of the ticket of the second ticket system.

10. The method of claim 9, comprising:
identifying, by the one or more processors, in the second ticket information, time record information corresponding to an amount of time for resolving the ticket of the second ticket system.

11. The method of claim 10, comprising:
updating, by the one or more processors, the ticket of the first ticket system with the time record information.

12. The method of claim 9, comprising:
selecting, by the one or more processors, a template based on a device referenced by the ticket of the second ticket system; and
initializing, by the one or more processors, the second ticket information based on the template.

13. The method of claim 9, comprising:
repairing, by the one or more processors responsive to responsive to the determination that a modification of an identifier of the ticket of the first ticket system is inconsistent with an identifier of the ticket of the second ticket system, one of the second ticket information and the first ticket information.

14. The method of claim 9, comprising:
modifying, by the one or more processors, responsive to the determination that a modification of an identifier of the ticket of the first ticket system is inconsistent with an identifier of the ticket of the second ticket system, the ticket of the first ticket system to correspond to the ticket of the second ticket system.

15. The method of claim 9, comprising:
modifying, by the one or more processors, responsive to the determination that a modification of an identifier of the ticket of the first ticket system is inconsistent with an identifier of the ticket of the second ticket system, the ticket of the second ticket system to correspond to the ticket of the first ticket system.

16. The method of claim 9, wherein the second ticket system comprises a device management system.

* * * * *